(12) United States Patent
Handy et al.

(10) Patent No.: US 7,987,428 B2
(45) Date of Patent: Jul. 26, 2011

(54) DASHBOARD EDITOR

(75) Inventors: Stephen Van de Walker Handy, Bremerton, WA (US); Leif Christian Brenne, Snoqualmie, WA (US); Peter Birkedal Peterson, Seattle, WA (US); Eric Friedrichsen, Redmond, WA (US); Scott W. Bishel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 878 days.

(21) Appl. No.: 11/877,093

(22) Filed: Oct. 23, 2007

(65) Prior Publication Data
US 2009/0106656 A1    Apr. 23, 2009

(51) Int. Cl.
G06F 3/00    (2006.01)
G06F 3/048    (2006.01)
G06F 7/00    (2006.01)

(52) U.S. Cl. ........ 715/762; 715/742; 715/744; 715/763; 715/764; 715/765; 715/769; 707/754

(58) Field of Classification Search ................. 715/762, 715/769, 763, 744, 747, 866, 765, 764, 742; 707/754
See application file for complete search history.

(56) References Cited

U.S. PATENT DOCUMENTS

| | | | | |
|---|---|---|---|---|
| 5,659,693 A * | 8/1997 | Hansen et al. | ................. | 715/779 |
| 6,684,369 B1 * | 1/2004 | Bernardo et al. | ............. | 715/205 |
| 6,738,079 B1 | 5/2004 | Kellerman et al. | | |
| 6,745,238 B1 | 6/2004 | Giljum et al. | | |
| 6,784,905 B2 * | 8/2004 | Brown et al. | ................. | 715/865 |
| 6,995,768 B2 * | 2/2006 | Jou et al. | ........................ | 345/440 |
| 7,039,871 B2 * | 5/2006 | Cronk | ........................... | 715/741 |
| 7,523,401 B1 * | 4/2009 | Aldridge | ....................... | 715/760 |
| 7,546,543 B2 * | 6/2009 | Louch et al. | ................. | 715/762 |
| 7,716,592 B2 * | 5/2010 | Tien et al. | ..................... | 715/744 |
| 7,801,874 B2 * | 9/2010 | Bernacki et al. | ............. | 707/706 |
| 2002/0023111 A1 | 2/2002 | Arora et al. | | |
| 2002/0078175 A1 * | 6/2002 | Wallace et al. | ............... | 709/219 |
| 2002/0116418 A1 | 8/2002 | Lachhwani et al. | | |
| 2003/0117437 A1 * | 6/2003 | Cook et al. | .................... | 345/764 |
| 2003/0222898 A1 | 12/2003 | Macomber | | |
| 2004/0123238 A1 * | 6/2004 | Hefetz et al. | ................. | 715/513 |
| 2004/0183831 A1 * | 9/2004 | Ritchy et al. | ................. | 345/762 |
| 2005/0071737 A1 * | 3/2005 | Adendorff et al. | ............ | 715/500 |
| 2005/0235293 A1 | 10/2005 | Fortes et al. | | |
| 2006/0112123 A1 * | 5/2006 | Clark et al. | ................... | 707/101 |
| 2006/0161471 A1 | 7/2006 | Hulen | | |
| 2006/0161596 A1 | 7/2006 | Chan | | |
| 2006/0235778 A1 | 10/2006 | Razvi | | |
| 2006/0274086 A1 * | 12/2006 | Forstall et al. | ................ | 345/629 |
| 2007/0011026 A1 * | 1/2007 | Higgins et al. | .................... | 705/2 |

(Continued)

OTHER PUBLICATIONS

ILOG JViews Diagrammer 8.0 the Dashboard Editor, http://www.ilog.com/products/jviews/diagrammer/documentation/usrdashboarddiag.pdf, Nov. 2006, 54 pages.

(Continued)

*Primary Examiner* — Tadeese Hailu
*Assistant Examiner* — Nicholas S Ulrich
(74) *Attorney, Agent, or Firm* — Merchant & Gould P.C.

(57) ABSTRACT

A user interface programmed to create a digital dashboard includes a dashboard workspace including one or more zones, and a dashboard elements area including a plurality of dashboard elements. A dashboard element of the dashboard elements is dragged and dropped onto one of the zones to add the dashboard element to the digital dashboard.

15 Claims, 34 Drawing Sheets

U.S. PATENT DOCUMENTS

| | | | |
|---|---|---|---|
| 2007/0022026 A1 | 1/2007 | Davidson | |
| 2007/0050237 A1 | 3/2007 | Tien | |
| 2007/0064012 A1 | 3/2007 | McCall | |
| 2007/0067757 A1 | 3/2007 | Amemiya et al. | |
| 2007/0083837 A1 | 4/2007 | Gristede et al. | |
| 2007/0101279 A1* | 5/2007 | Chaudhri et al. | 715/762 |
| 2007/0113194 A1* | 5/2007 | Bales et al. | 715/769 |
| 2007/0118793 A1 | 5/2007 | Arora et al. | |
| 2007/0118813 A1* | 5/2007 | Forstall et al. | 715/805 |
| 2007/0130541 A1* | 6/2007 | Louch et al. | 715/804 |
| 2007/0143161 A1 | 6/2007 | Tien | |
| 2007/0143174 A1 | 6/2007 | Tien | |
| 2007/0168931 A1 | 7/2007 | Martin et al. | |
| 2007/0260582 A1* | 11/2007 | Liang | 707/2 |
| 2008/0034314 A1* | 2/2008 | Louch et al. | 715/778 |
| 2008/0127052 A1* | 5/2008 | Rostoker | 717/105 |
| 2008/0148155 A1* | 6/2008 | Kogan et al. | 715/736 |
| 2008/0263462 A1* | 10/2008 | Mayer-Ullmann et al. | 715/762 |
| 2009/0006987 A1* | 1/2009 | Simhi et al. | 715/762 |
| 2009/0106640 A1 | 4/2009 | Handy | |

OTHER PUBLICATIONS

Plan Dashboards and Filters, http://technet2.microsoft.com/Office/en-us/library/5fe87ec1-431e-4b7f-ae33-1e2edd8613b1103.mspx?pf=true, Nov. 16, 2006, 8 pages.

Valtira, The Simplicis™ Marketing Dashboard Developers' Guide, http://www.valtira.com/media/document/ developerquickstarttutorial.pdf, 13 pages (admitted prior art as of the filing date).

Documentum Web Publisher Page Builder © 2006, 3 pages.

MicroStrategy Products, © 2006, 12 pages.

Scorecards Provide a Foundation for Business Performance Management at Microsoft, Nov. 1, 2005, 8 pages.

Using Reporting Services SharePoint Web Parts in SQLServer 2000 Reporting Services Service Pak 2, Apr. 25, 2005, 14 pages.

* cited by examiner

DASHBOARD EDITOR

BACKGROUND

A digital dashboard, sometimes referred to as an enterprise dashboard or an executive dashboard, is a tool used by a business to gauge the health of the business. Typically, the digital dashboard provides a visual layout of key performance metrics for the business pulled from a variety of data sources.

A digital dashboard will typically show one or more Key Performance Indicators, also known as KPIs or Key Success Indicators (KSI). KPIs help an organization define and measure progress toward organizational goals. Once an organization has analyzed its mission, identified all its stakeholders, and defined its goals, it needs a way to measure progress toward those goals. KPIs are used to provide those measurements.

KPIs can be organized on the dashboard into one or more scorecards. Scorecards are used to provide detailed and summary analysis of KPIs and aggregated KPIs such as KPI groups, objectives, and the like. Business logic applications that generate, author, and analyze scorecards are typically enterprise applications with multiple users (subscribers), designers, and administrators.

SUMMARY

In one aspect, a user interface programmed to create a digital dashboard includes a dashboard workspace including one or more zones, and a dashboard elements area including a plurality of dashboard elements. A dashboard element of the dashboard elements is dragged and dropped onto one of the zones to add the dashboard element to the digital dashboard.

In another aspect, a method for creating a digital dashboard includes: creating one or more zones in a dashboard module; dragging and dropping a scorecard or report onto a zone; dragging and dropping a filter onto the zone; and linking the filter to the scorecard or report.

In yet another aspect, a method for creating a filter that is programmed to modify one or more scorecards or reports in a digital dashboard includes: allowing for selection of a filter template from a plurality of filter templates, the template defining a type of the filter; allowing for selection of a data source for the filter; allowing for selection of filter parameters from the data source; allowing for selection of a display method for the filter; and compiling the filter from the filter template, the filter parameters, and the display method.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings.

DETAILED DESCRIPTION

The present application is directed to systems and methods for creating and editing digital dashboards.

Figure 1:
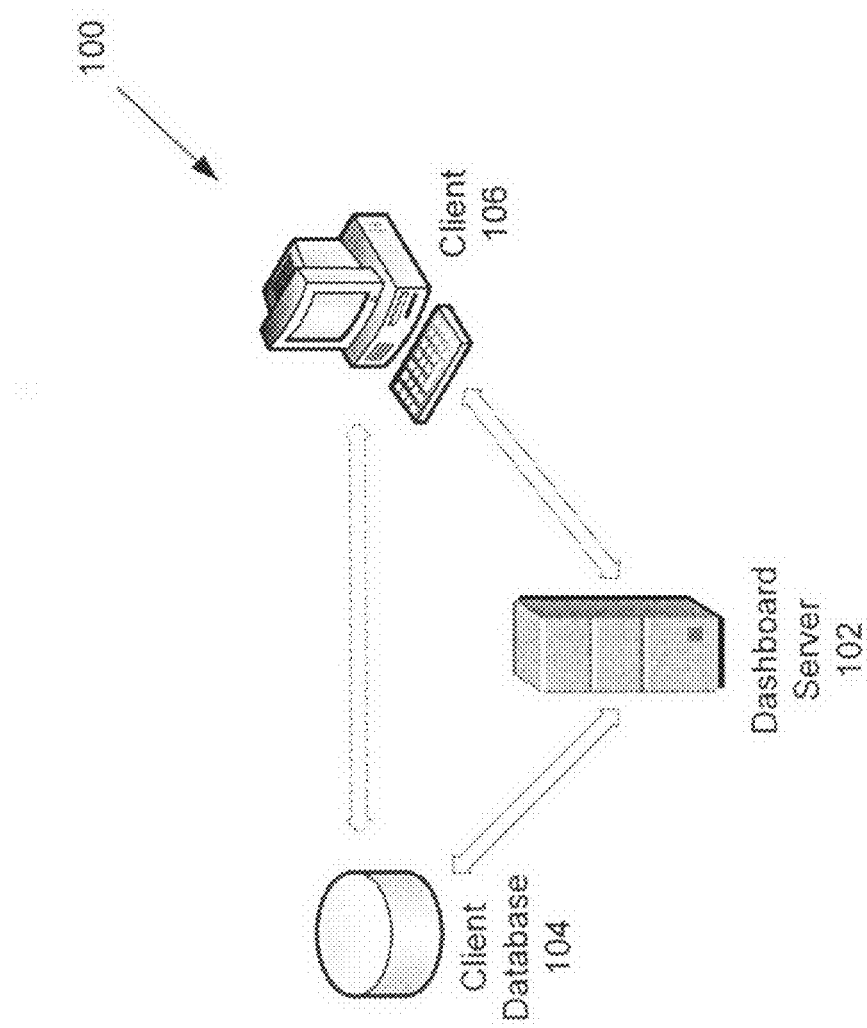
FIG. 1 shows an example system including a client, a dashboard server, and a data source.

FIG. 1 shows a basic system 100 for dashboard implementation. The system 100 includes a dashboard server 102, a client database 104, and a client 106. While the three elements of system 100 are shown communicating directly with each other, the dashboard server 102 can interact with the database 104 and the client 106 over a network (not shown) for performing rendering dashboards.

The network can be a secure network such as an enterprise network, or an unsecured network such as a wireless open network. Such a network is intended to provide communication between the nodes described above. By way of example, the network can include wired media such as a wired network or direct-wired connection, and wireless media such as acoustic, RF, infrared and other wireless media.

The system 100 can also include any topology of servers, clients, Internet service providers, and communication media. Also, the system 100 can have a static or dynamic topology. A business logic application can be run centrally on the server 102 or in a distributed manner over several servers and/or client devices. The server 102 can include a number of information systems, such as performance measures, business scorecards, and exception reporting. A number of organization-specific applications including, but not limited to, financial reporting, analysis, booking, marketing analysis, customer service, and manufacturing planning applications can also be configured, deployed, and shared in the system 100.

In example embodiments, one or more dashboards including performance measures, business scorecards, and exception reporting are published to the server 102 and are accessible to the client 106. In one embodiment, the server 102 is a MICROSOFT® Office PERFORMANCEPOINT™ Server 1007 developed by Microsoft Corporation of Redmond, Wash. Other configurations are possible.

The client database 104 is an example of a number of data sources that can provide input to the server 102. Additional data sources can include SQL servers, databases, non multi-dimensional data sources such as text files or EXCEL sheets, multi-dimensional data source such as data cubes, and the like.

In example embodiments, the server 102 and the client 106 are computer systems. For example, the client 106 can be a personal computing device, such as a desktop or laptop computer, a personal data assistant, or a cellular telephone. The client 106 can include input/output devices, a central processing unit ("CPU"), a data storage device, and a network device. Typical input/output devices include keyboards, mice, displays, microphones, speakers, disk drives, CD-ROM drives, and flash drives. Computer readable media, such as the data storage device, provide for data retention. By way of example, computer readable media can include computer storage media and communication media. Computer storage media includes volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Among the plurality of information stored on the data storage device is a client operating system ("OS") and client applications. The client OS is a program that manages the hardware and software resources of the client system. The client applications utilize the resources of the client 106 to directly perform tasks specified by the user. The network device enables the client 106 to send and receive data to/from the server 102. Other configurations for the client 106 are possible.

In a typical application, users can interact with the server 102 running the business logic application from the client 106 and provide information as to what kind of scorecard calculation, on which data, and what type of reporting are desired. Based on the provided information, the server 102 can determine a hierarchy of a scorecard and retrieve data associated with the scorecard metrics from the client database 104. The server 102 can then perform the scorecard calculation and provide the digital dashboard with the desired information.

The dashboards and other metrics that reside on the server 102 and that are presented to the client 106 can be created using the systems and methods described below. For example, in one embodiment, a dashboard is created using a dashboard editor that allows business metrics, such as KPIs, to be dragged and dropped onto zones defined by the dashboard.

Examples of editors used to create dashboards are described below.

Figure 2:
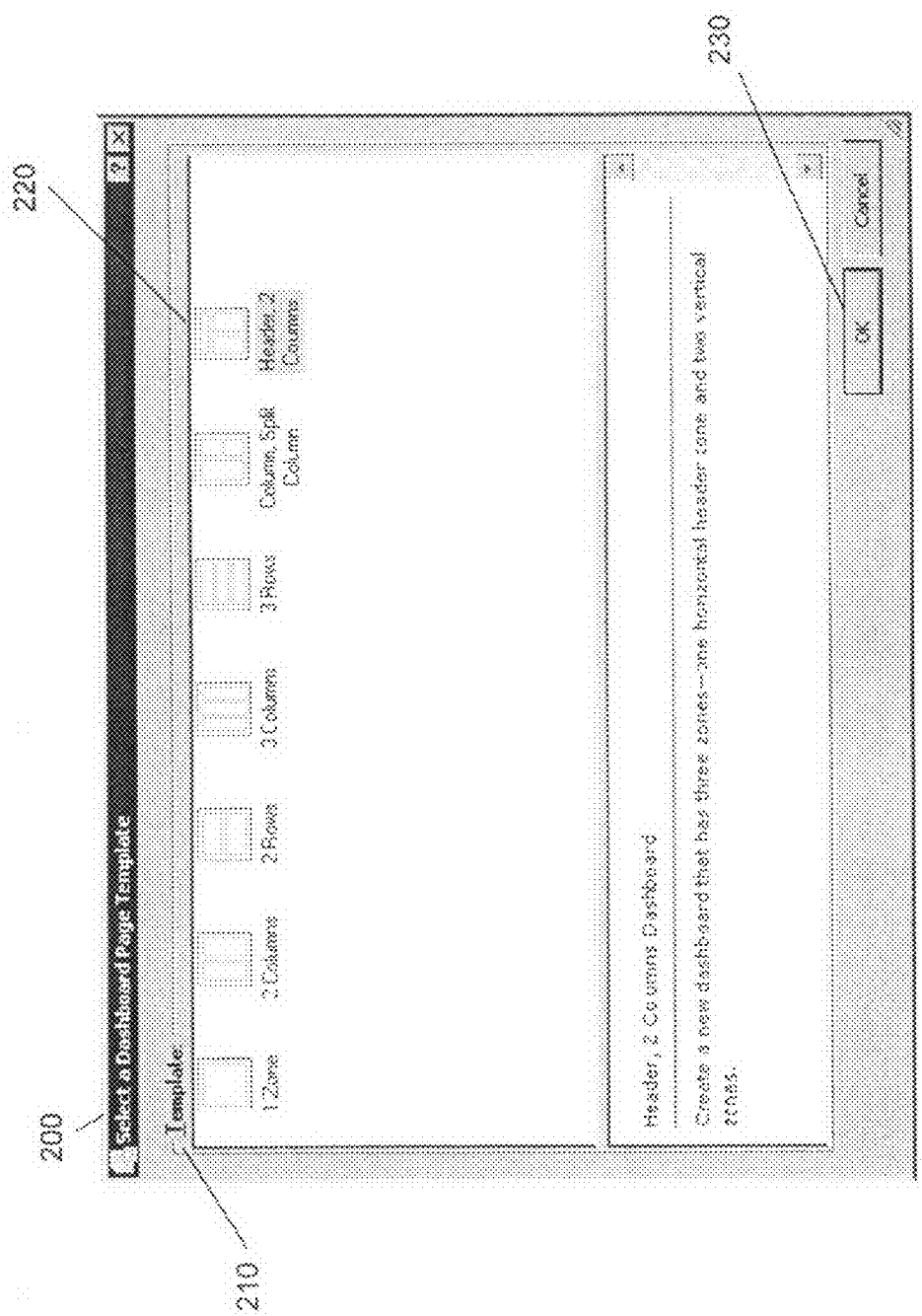
FIG. 2 shows an example template interface for selecting a template for a dashboard.

Referring now to FIG. 2, an example dashboard template interface 200 for selecting a template for the dashboard is shown. The template interface 200 includes a template area 210 that lists a plurality of templates for the dashboard. The templates provide a pre-defined layout for a dashboard. For example, templates including one zone, multiple columns or rows, and split columns can be selected from the template area 210. In this example, the template 220 for a dashboard containing a header and two columns is highlighted. The user selects an OK button 230 to continue.

Figure 3:
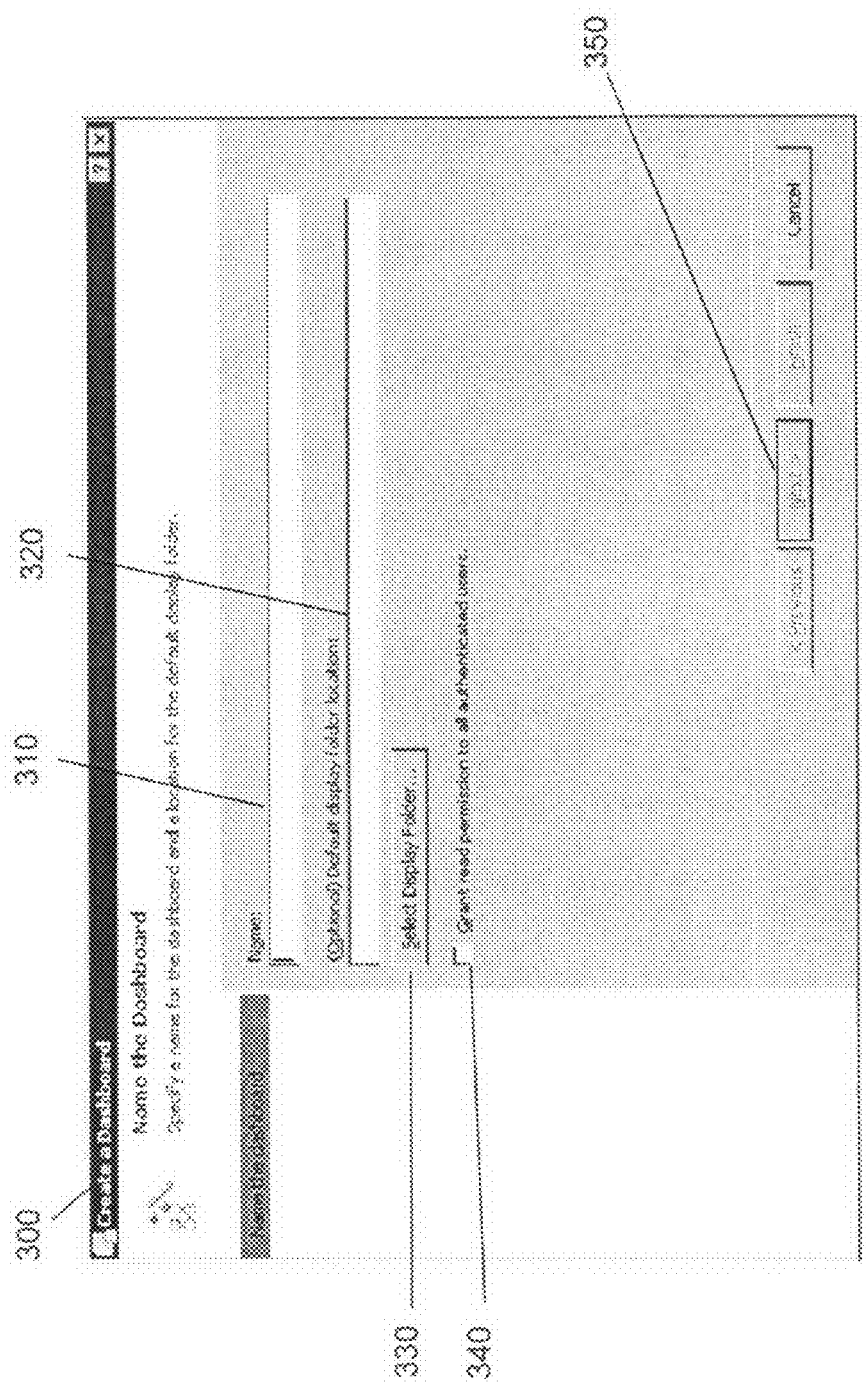
FIG. 3 shows an example name interface for naming a dashboard.

Referring now to FIG. 3, a name interface 300 is shown. The name interface 300 includes a text box 310 that allows the user to enter a name for the dashboard. A text box 320 allows the user to select a folder to store the dashboard. Alternatively, the user can click on a select display folder button 330 to browse available folders for storage of the dashboard. The user can also allow authenticated users to view the dashboard by clicking checkbox 340. The user then clicks a next button 350 to begin editing the dashboard.

Figure 4:
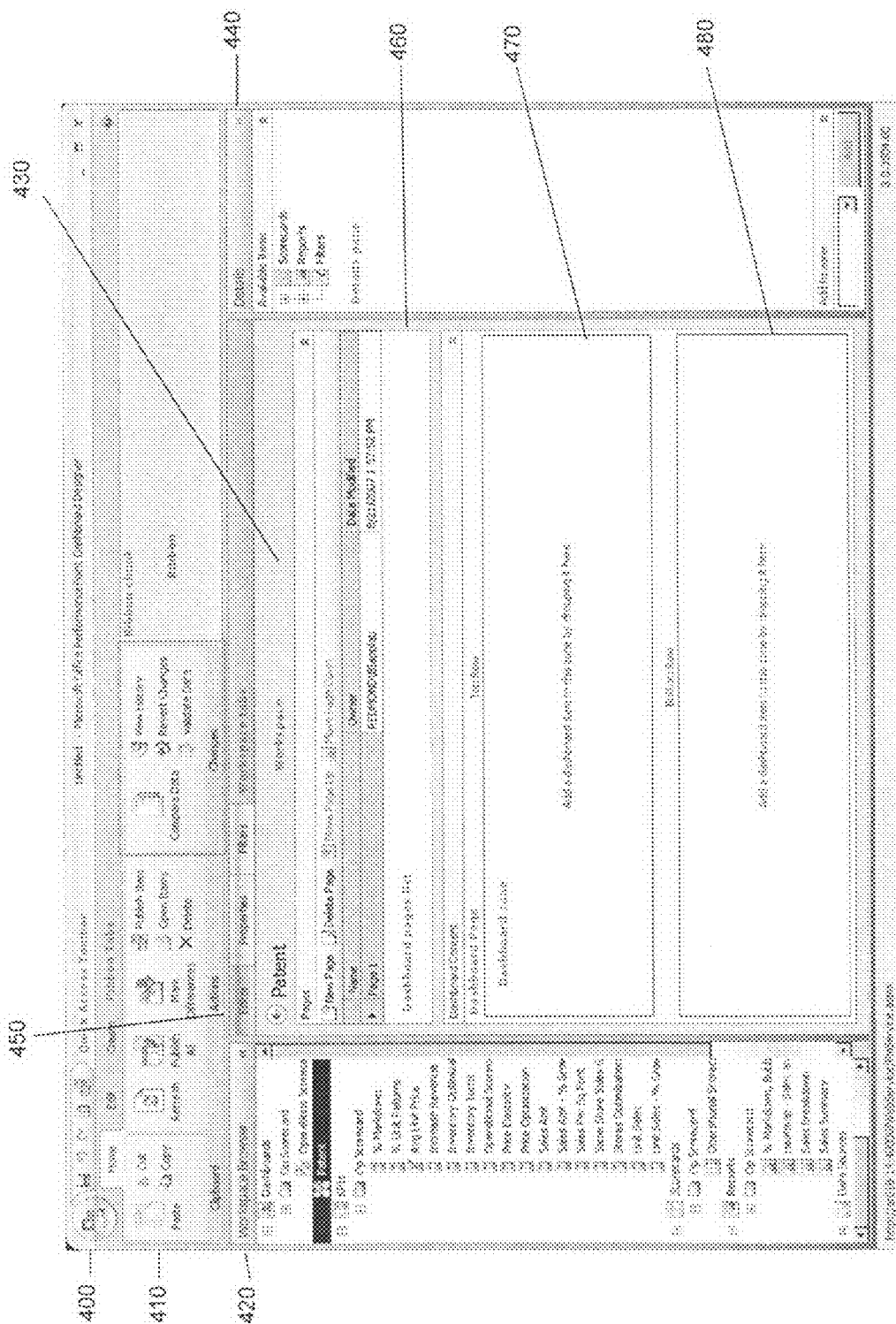
FIG. 4 shows an example dashboard editor for creating a dashboard.

FIG. 4 shows an example dashboard editor 400. The dashboard editor 400 contains an example ribbon 410 with various control elements. The dashboard also includes a workspace browser 420 for identifying where the dashboard and other metrics such as KPIs are stored, a dashboard workspace 430 containing zones in which dashboard elements can be dropped, and an items area 440 containing available scorecards, reports, and filters that can be dropped into the zones in the dashboard workspace 430.

In example embodiments, the scorecards listed in the items area 440 are created using a scorecard editor such as that disclosed in U.S. patent application Ser. No. 11/877,127, filed on even date herewith and entitled "Scorecard Interface Editor." Other configurations and sources for the scorecards and other metrics listed in the items area 440 can be used.

The ribbon 410 includes control elements that allow the user to make style and format changes to the dashboard, update the data in the dashboard, and for publishing the dashboard to a server. For example, when a dashboard is complete, the user can select a publish icon from the ribbon 410 to publish the dashboard to a server, such as server 102.

For the example shown in FIG. 4, the dashboard workspace 430 includes a header 460 and two zones 470, 480 created from the template selected for the dashboard. The header 460 is at the top of dashboard workspace 430. The dashboard workspace 430 also includes three tabs 450 at the top (the edit tab is currently highlighted). Each tab presents a different dashboard workspace view, as described below. In the example shown, the editor view is selected for the workspace 430.

Figure 5:
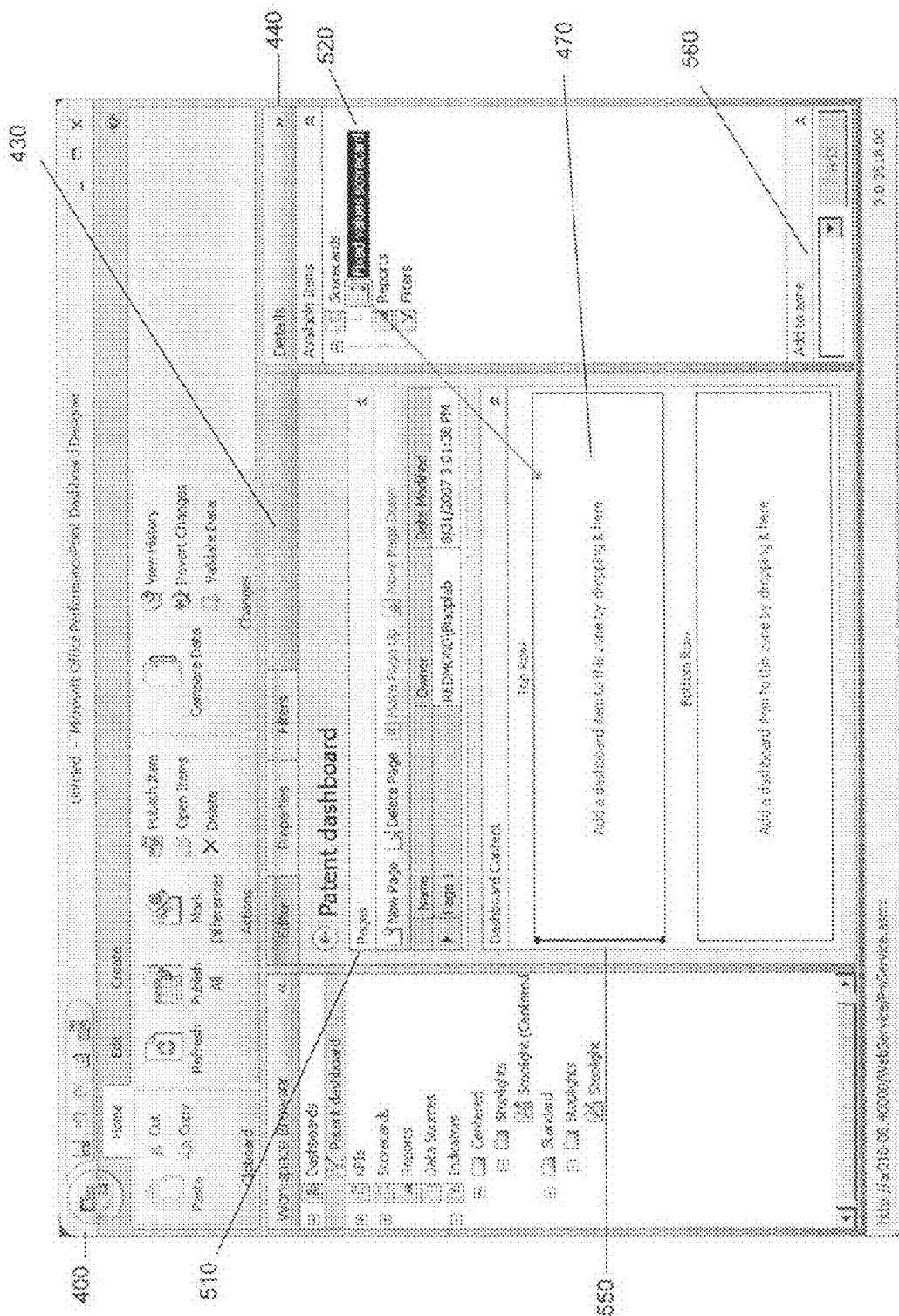
FIG. 5 shows the dashboard editor of FIG. 4 with a KPI dragged and dropped onto a zone of a dashboard workspace.

Referring now to FIG. 5, the dashboard can include multiple pages. A toolbar 510 allows pages to be added, deleted or moved. Pages provide flexibility to the user in presenting the dashboard. For example, one page can show an overview of key performance indicators. Another page can provide a detailed view.

In operation, an available item, such as a scorecard, report or filter can be dragged and dropped from the items area 440 into a zone in the workspace 430. For example, a fixed value scorecard 520 is shown being dragged from the items area 440 onto the top zone 470 in the dashboard workspace 430. When the fixed value scorecard 520 is dragged, an outline 550 of the top zone 470 is highlighted (e.g., in a blue color) to provide an indication to the user that the scorecard 520 can be dropped in the top zone 470. A zone can hold multiple scorecards, reports or filters.

Figure 6:
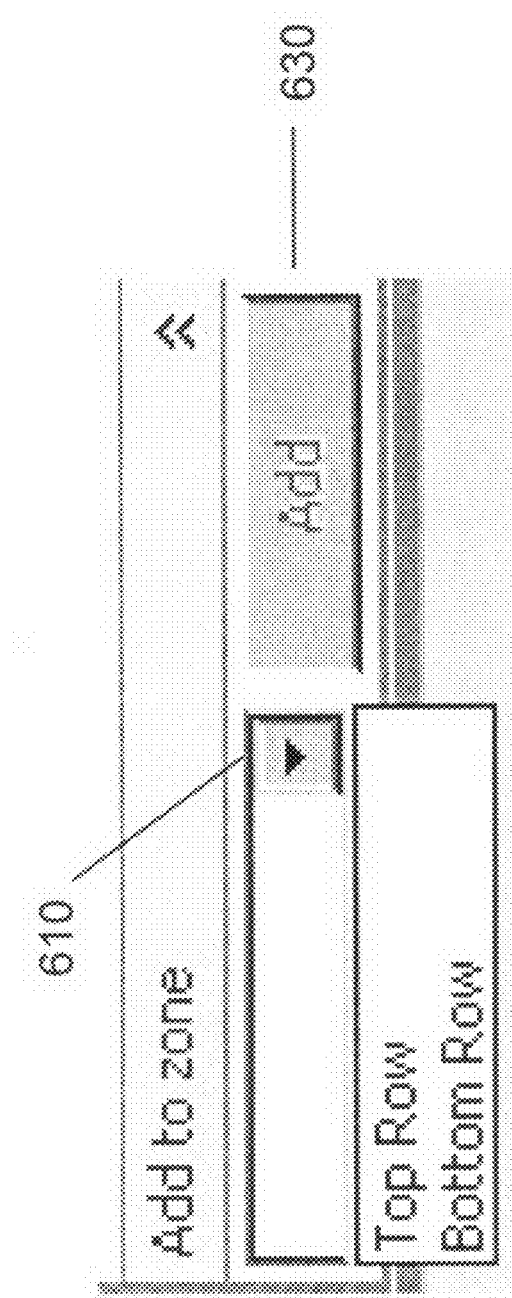
FIG. 6 shows a portion of the dashboard editor of FIG. 4 including an add to zone control.

The dashboard editor 400 also includes an add to zone control 560. The add to zone control 560, shown separately in FIG. 6, allows the user to choose an item in the items area 440 and then select a zone into which the item is added. For example, once an item is highlighted in the items area 440, the add to zone control includes dropdown list button 610 which displays the available zones in the workspace 430 (e.g., top row and bottom row). The user selects the desired zone and then clicks an add button 630 to add the selected item to the selected zone in the dashboard workspace 430.

Figure 7:
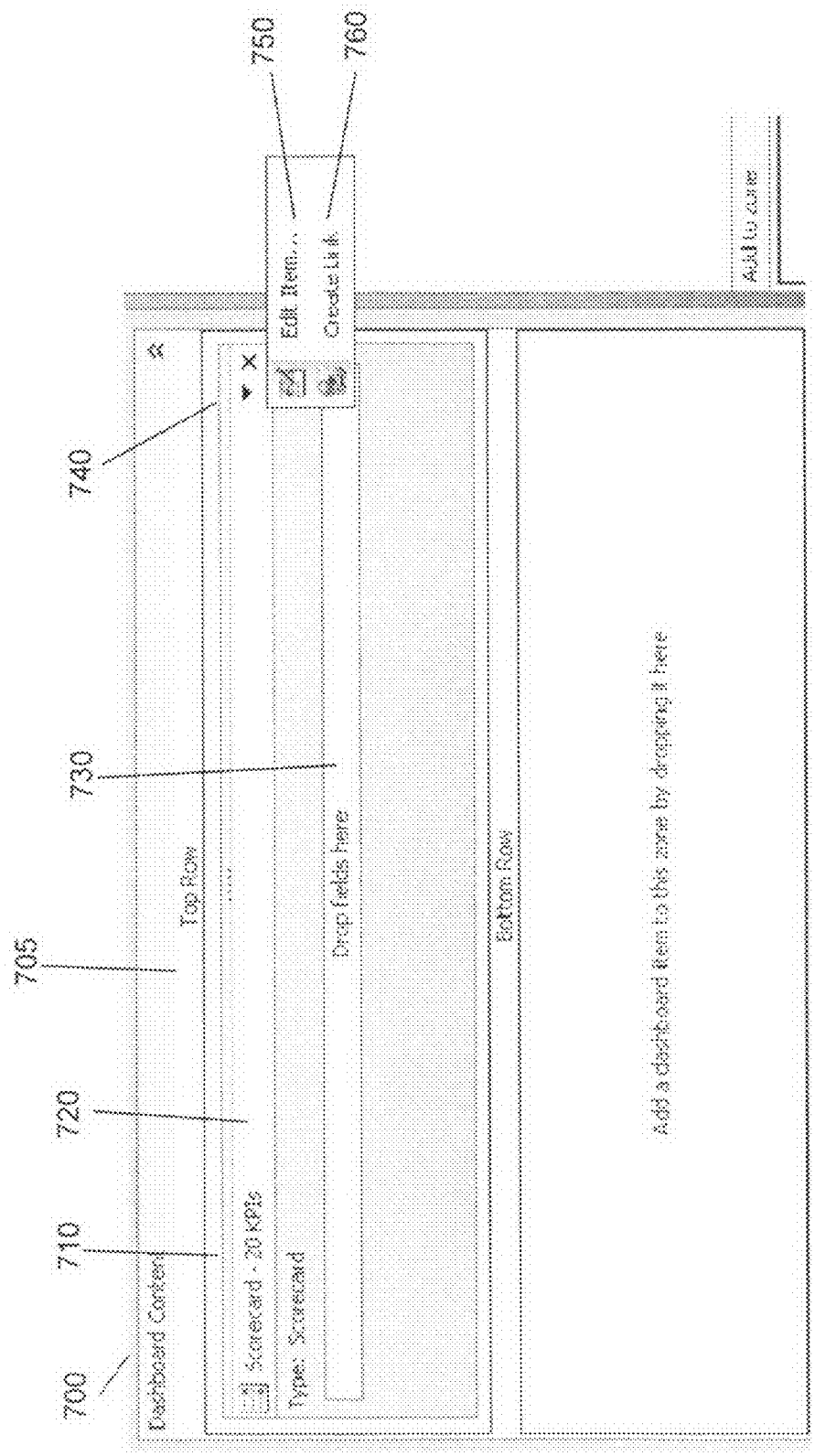
FIG. 7 shows a portion of the dashboard editor of FIG. 4 including several zones of a dashboard workspace.

Referring now to FIG. 7, the zones of an example workspace 700 are shown in more detail. A top row zone 705 includes a logical representation of a scorecard 720 that has been added to the zone 705. The example scorecard 720 includes a grab bar 710 for moving the scorecard within the zone, a title area 720, a drop zone area 730 in which filters are placed, and a pull-down menu 740. The example pull-down menu 740 contains options 750 for editing an item and 760 for creating a link. When option 740 for editing a link is selected, an example edit item screen 800 shown in FIGS. 8 and 9 is displayed.

Figure 8:
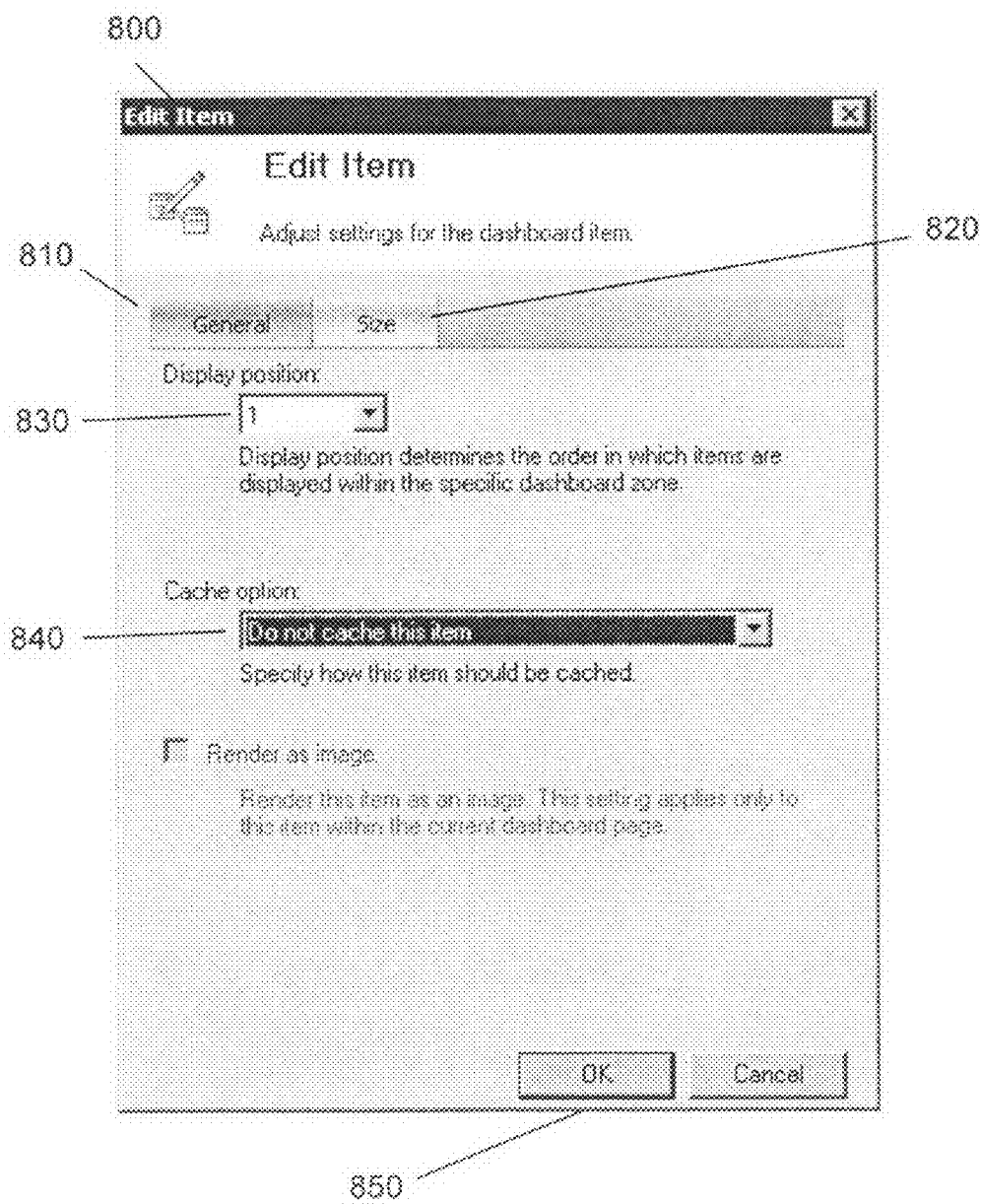
FIG. 8 shows an example edit item interface for editing properties of a zone of a dashboard.

In FIG. 8, the edit item interface 800 includes a general tab 810 and a size tab 820. The general tab 810 is highlighted, showing a display position text box 830 and cache option text box 840. The display position text box 830 allows the user to position the item in the zone. For example, if "1" is selected, this item is first in the zone. The cache option text box 840 provides options as to how the item should be cached or whether the item should be cached. When an OK button 850 is clicked, the changes are applied to the item, for example to the scorecard or the report.

Figure 9:
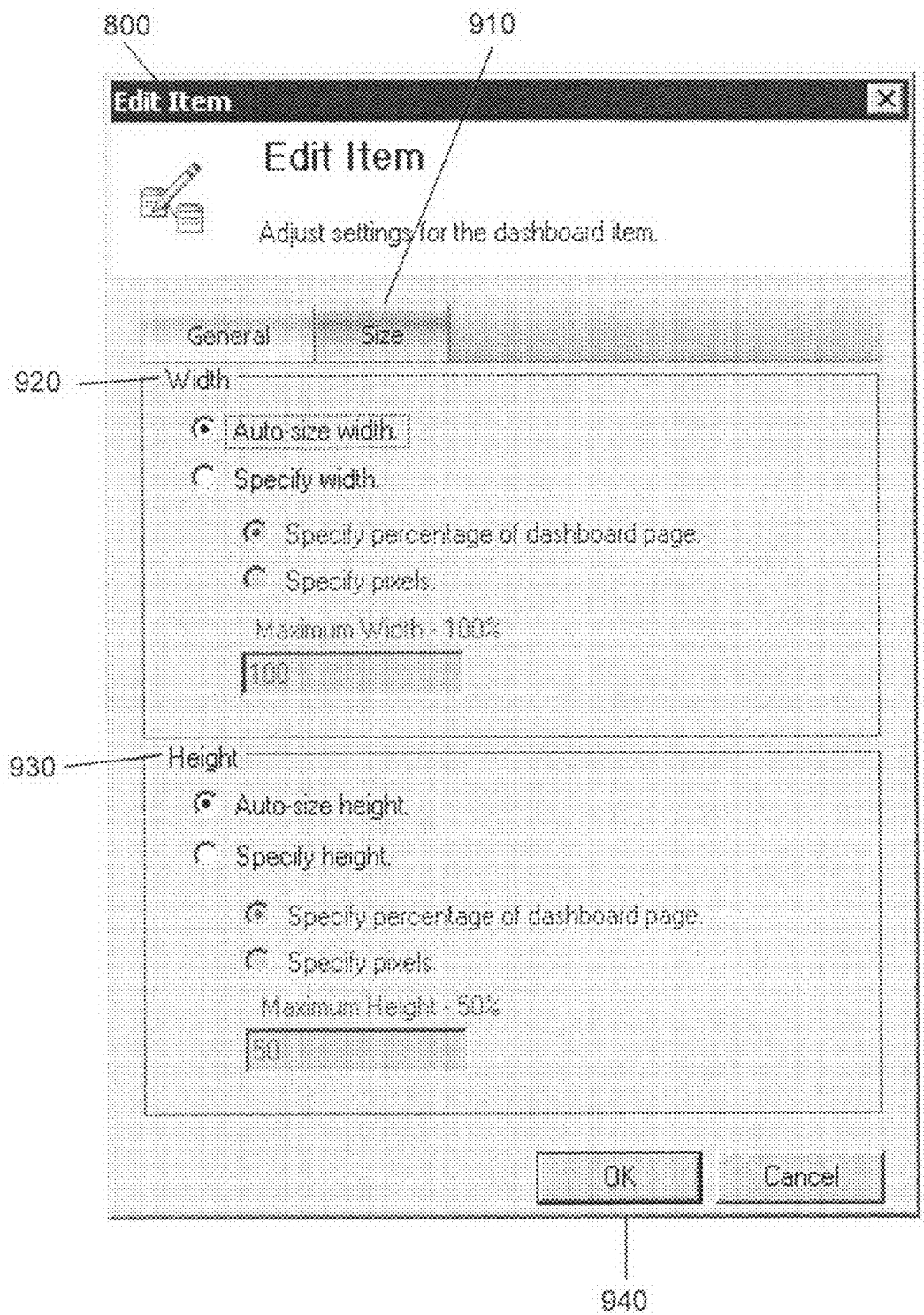
FIG. 9 shows another view of the edit item interface of FIG. 8.

FIG. 9 shows the edit item screen 800 presented to the user when the size tab 910 is selected. The size tab 910 allows the user to adjust the width 920 and the height 930 of the item in the zone. The width and height can be automatically adjusted to fit the zone or it can be user selectable, either by specifying a percent width and height for the item in the zone or by specifying the exact pixel size for the width and height. The changes are applied when an OK button 940 is selected.

Figure 10:
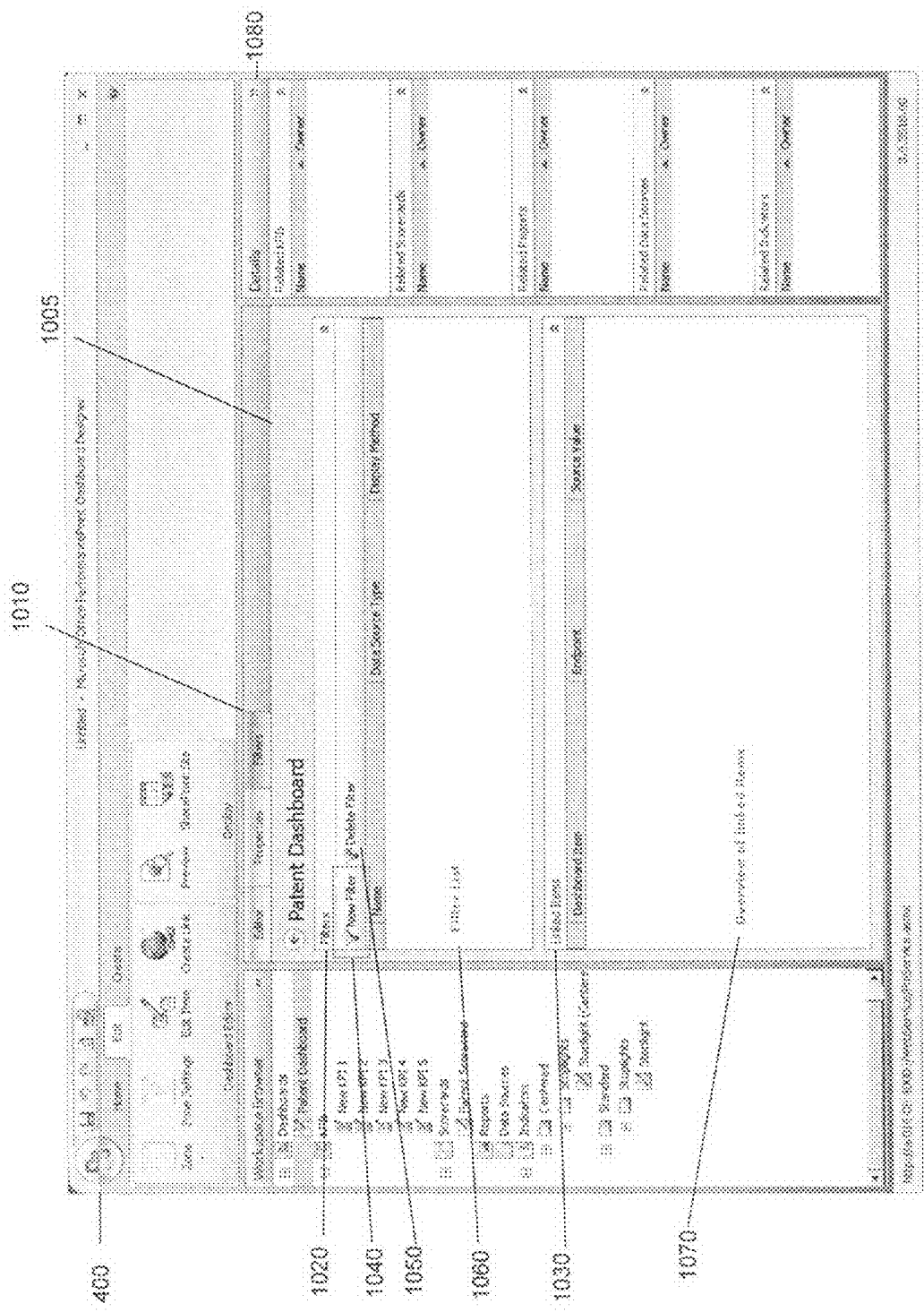
FIG. 10 shows the dashboard editor of FIG. 4 including a filter workspace.

FIG. 10 shows the dashboard editor 400 with the filter tab 1010 selected to access a filter workspace 1005. The filter tab 1010 includes a filter module 1020, a linked items module 1030, and a details module 1080. The filter module 1020 provides a list of available filters. The linked items module 1030 provides a list of the items, such as scorecards and reports, to which the filters are applied. The details module 1080 provides the details of related information associated with the filter, such as related KPIs, related scorecards, related reports, related data sources and related indicators.

The example filter module 1020 includes a new filter button 1040, a delete filter button 1050, and a filter list area 1060. The filter list area 1070 provides a list of available filters. Similarly, the example linked items module 1030 contains an overview of the linked items area 1070 which provides a list of scorecards and reports to which filters are applied.

Figure 11:
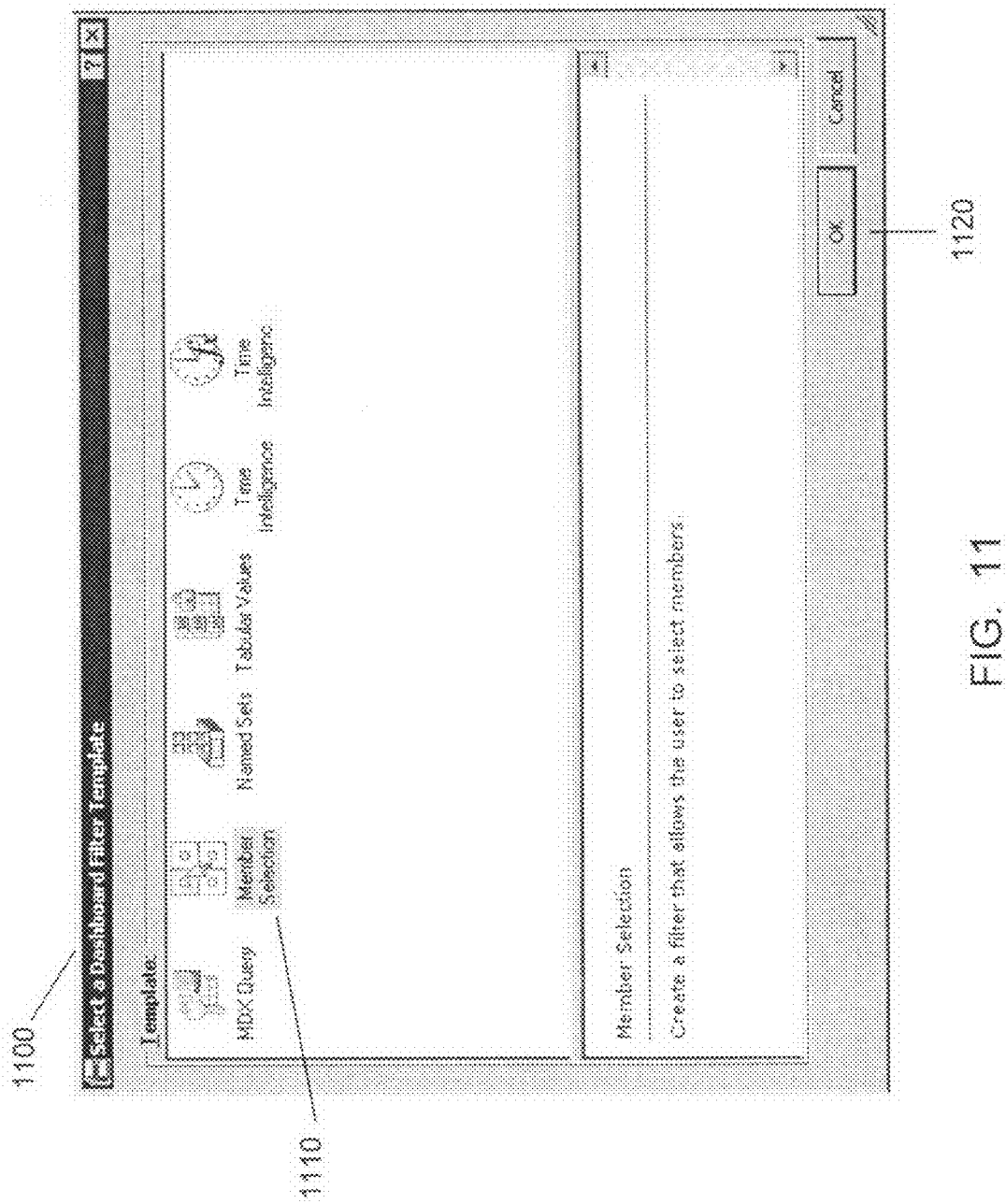
FIG. 11 shows an example filter template interface of a filter creation wizard.

A filter wizard is provided to guide the user through the filter creation. To create a new filter, the user clicks the new filter button 1040. This brings up example new filter template 1100 shown in FIG. 11. A menu 1210 lists the various steps of the wizard and generally orients the user as to which step in the wizard the user is currently on.

The user can create a filter from a plurality of templates, including MDX query, member selection, named sets, tabular values and timed intelligence templates. MDX query enables manual input of MDX to filter the scorecard or report objects. Member selection allows the user to select specific members from the data sources. Named sets creates a filter based on a named set. Tabular values creates a filter list from tabular values. Time intelligence uses time intelligence members to create a filter. Time intelligence can also be used with formulas on the filter links. For the example shown, the member selection template 1110 is highlighted. The user selects an OK button 1120 to continue.

Figure 12:
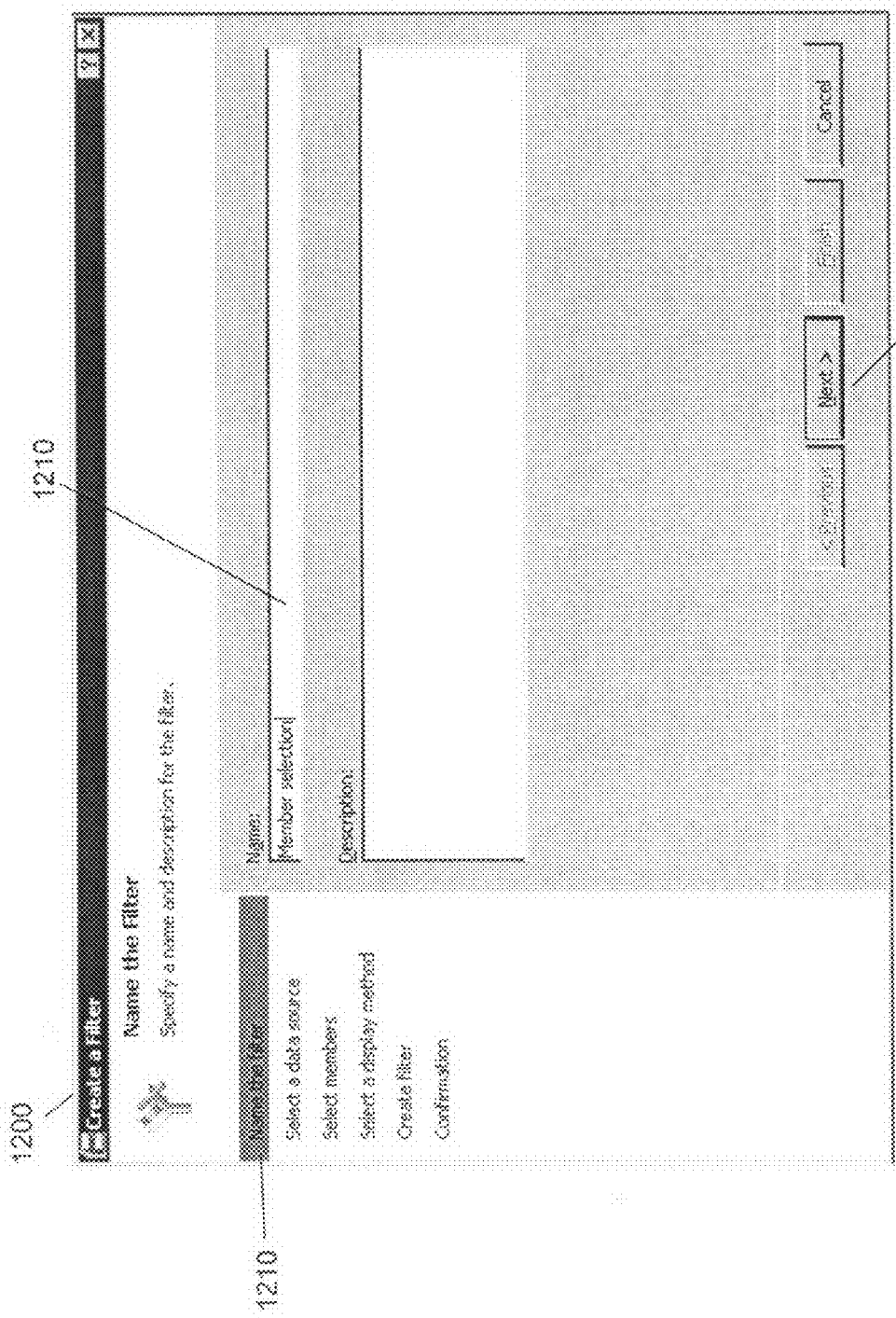
FIG. 12 shows an example name interface of a filter creation wizard.

An example name interface 1200 is shown in FIG. 12 is provided. The user enters a name for the filter in text box 1210 and clicks a next button 1220 to continue.

Figure 13:
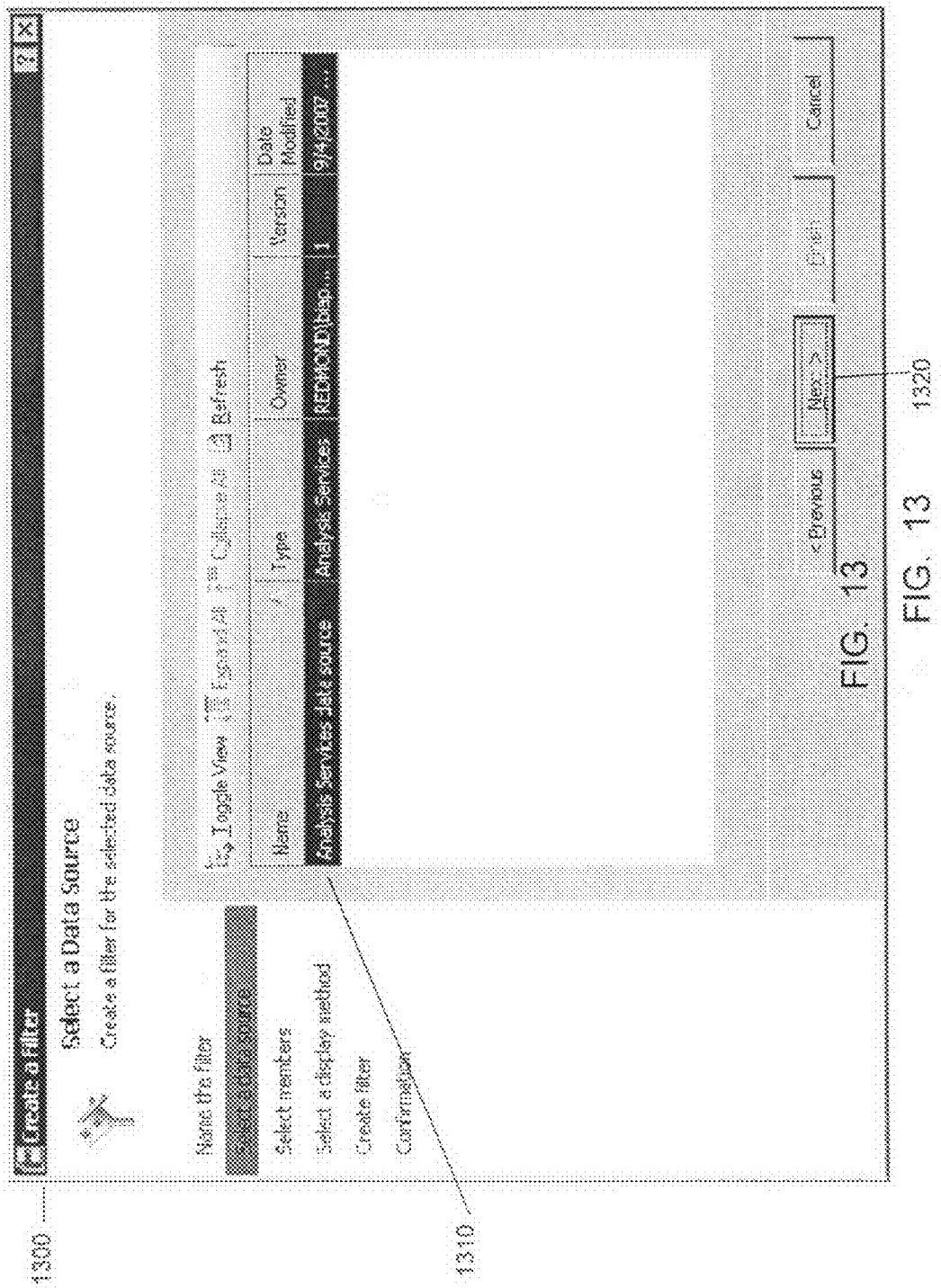
FIG. 13 shows an example data source interface of a filter creation wizard.
Figure 14:
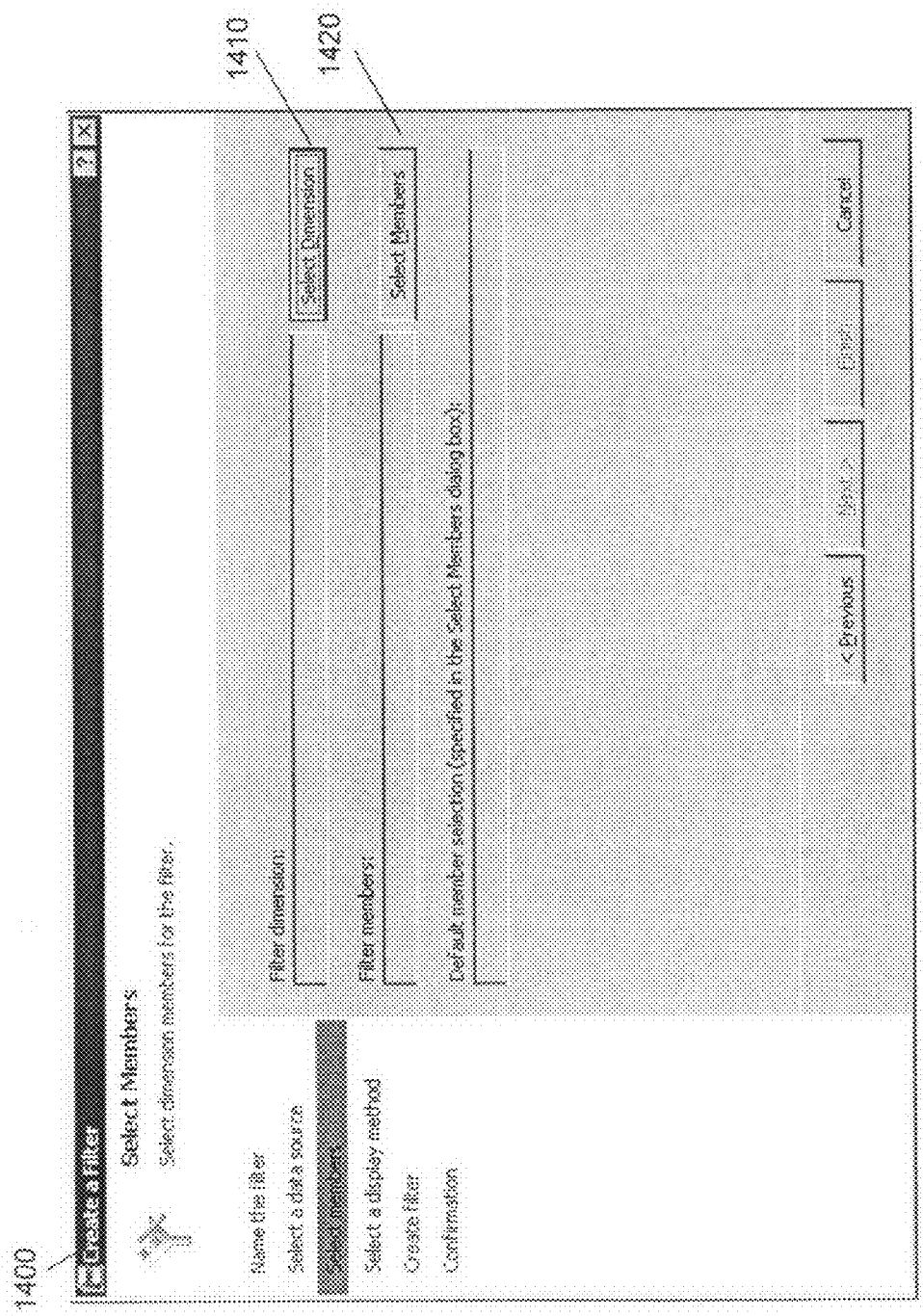
FIG. 14 shows an example select members interface of a filter creation wizard.

A data source selection interface 1300 is shown in FIG. 13. In the example, only one data source for the filter is listed, the Analysis Services data source 1310. In other examples, multiple data sources that are associated with the selected filter can be shown. The user selects a data source by highlighting it and clicking a next button 1320 to continue.

This brings up a members interface 1400 for adding dimensions and members to the filter. To add dimensions to the filter, a select dimensions button 1410 is clicked.

Figure 15:
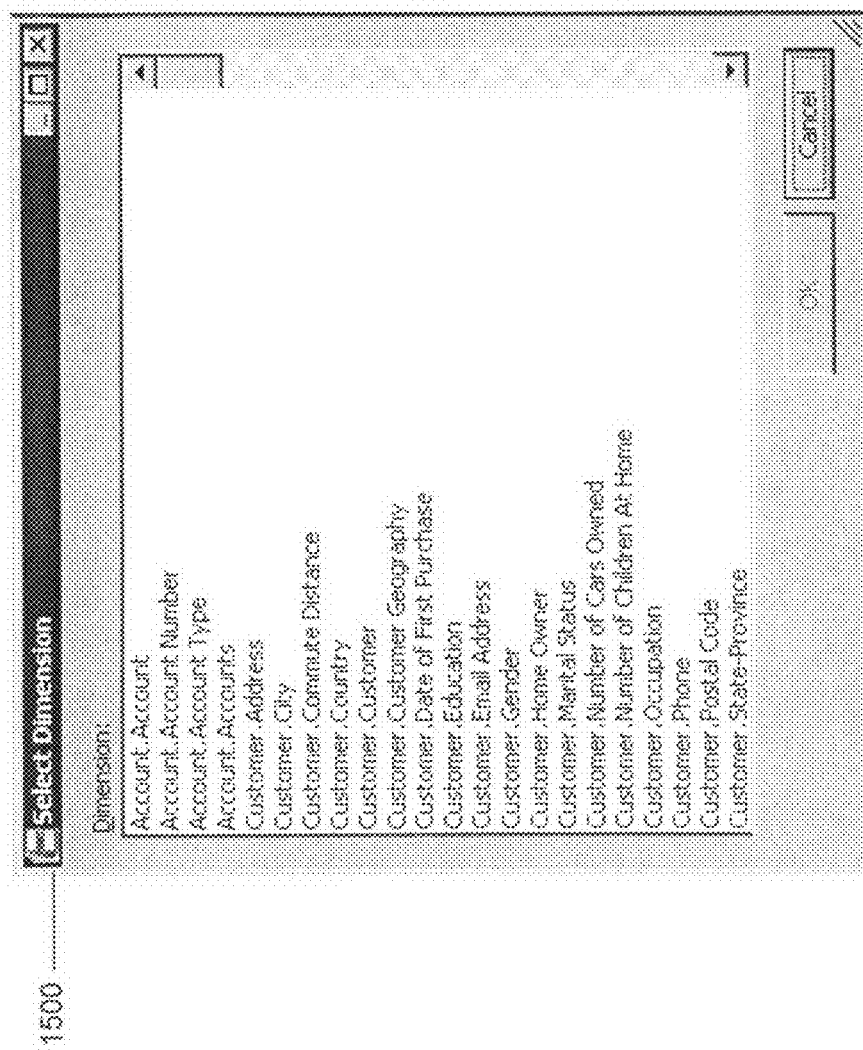
FIG. 15 shows an example dimensions interface of a filter creation wizard.

An example interface 1500 for adding dimensions to the filter is shown in FIG. 15. Example dimensions that can be added include account number, customer city and address, customer occupation and customer marital status.

Figure 16:
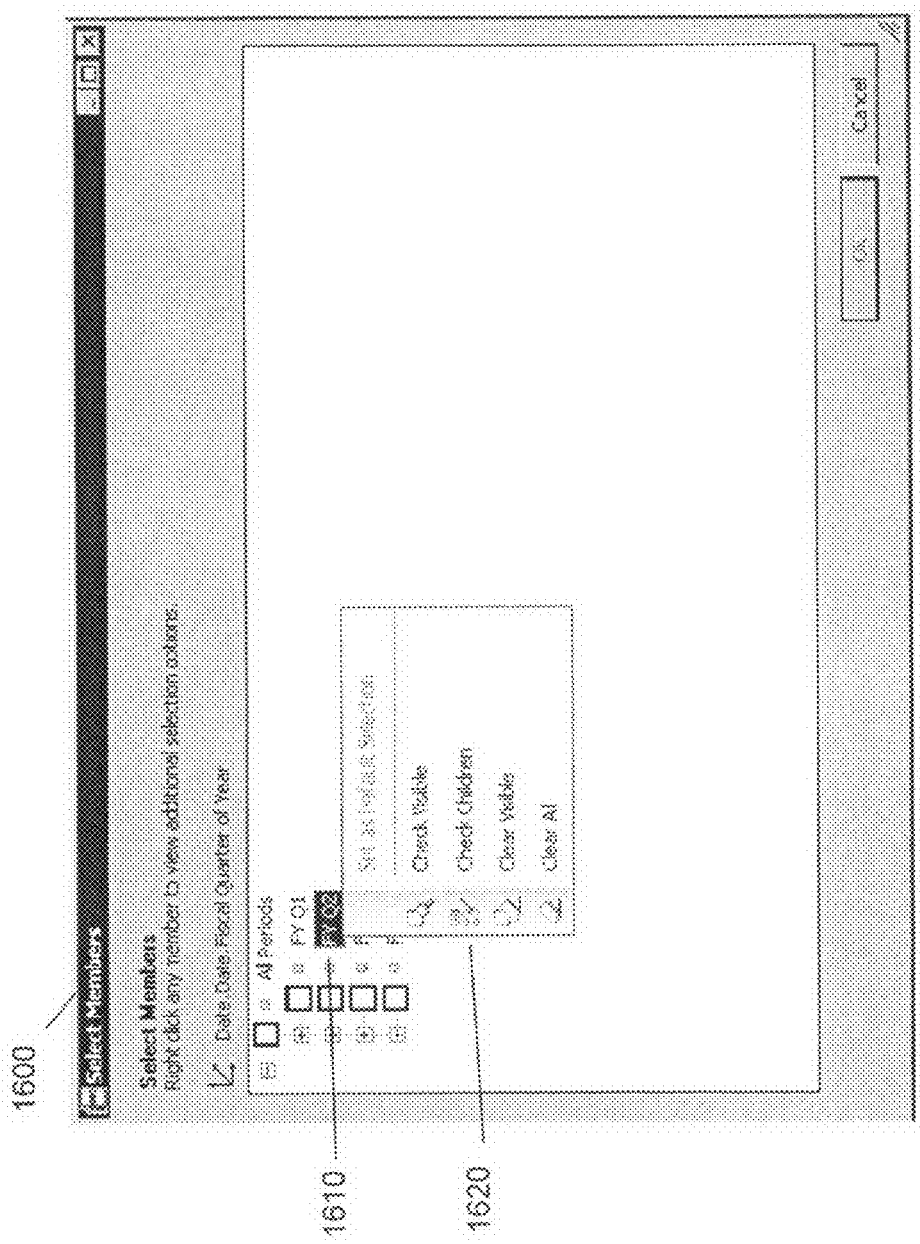
FIG. 16 shows an example selecting member interface of a filter creation wizard.

Referring now to FIG. 16, filter members are added by clicking the select members button 1410 to access the select members interface 1600. The user can select a member for the filter from a list of available members. In the example shown, the member 1610 for fiscal quarter 2 is selected. By right clicking on the selection, the user is present with example options 1620 which allows the user to identify properties associated with the selected member, as well as define a default member.

Figure 17:
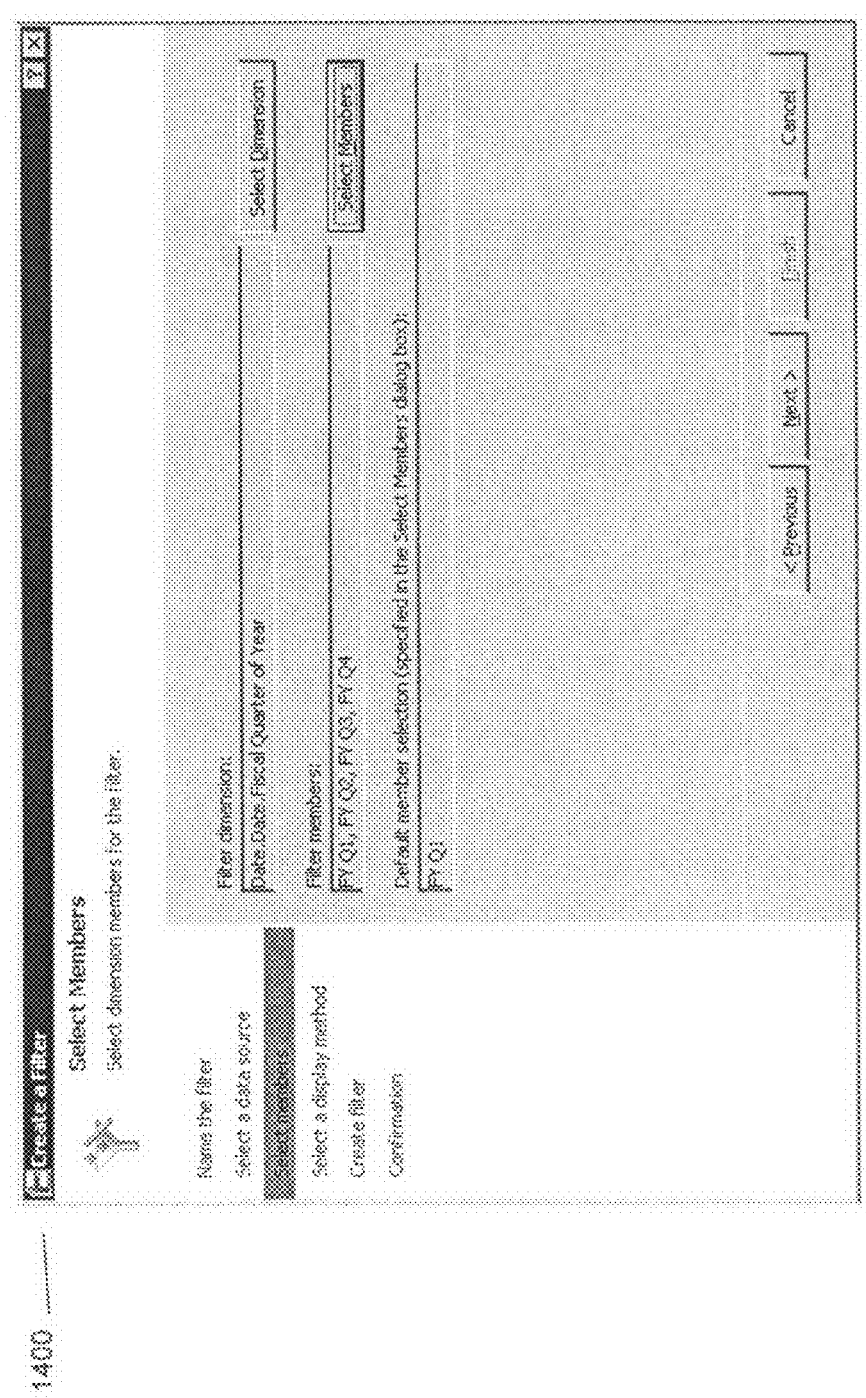
FIG. 17 shows the select member interface of FIG. 14 with example content displayed.
Figure 18:
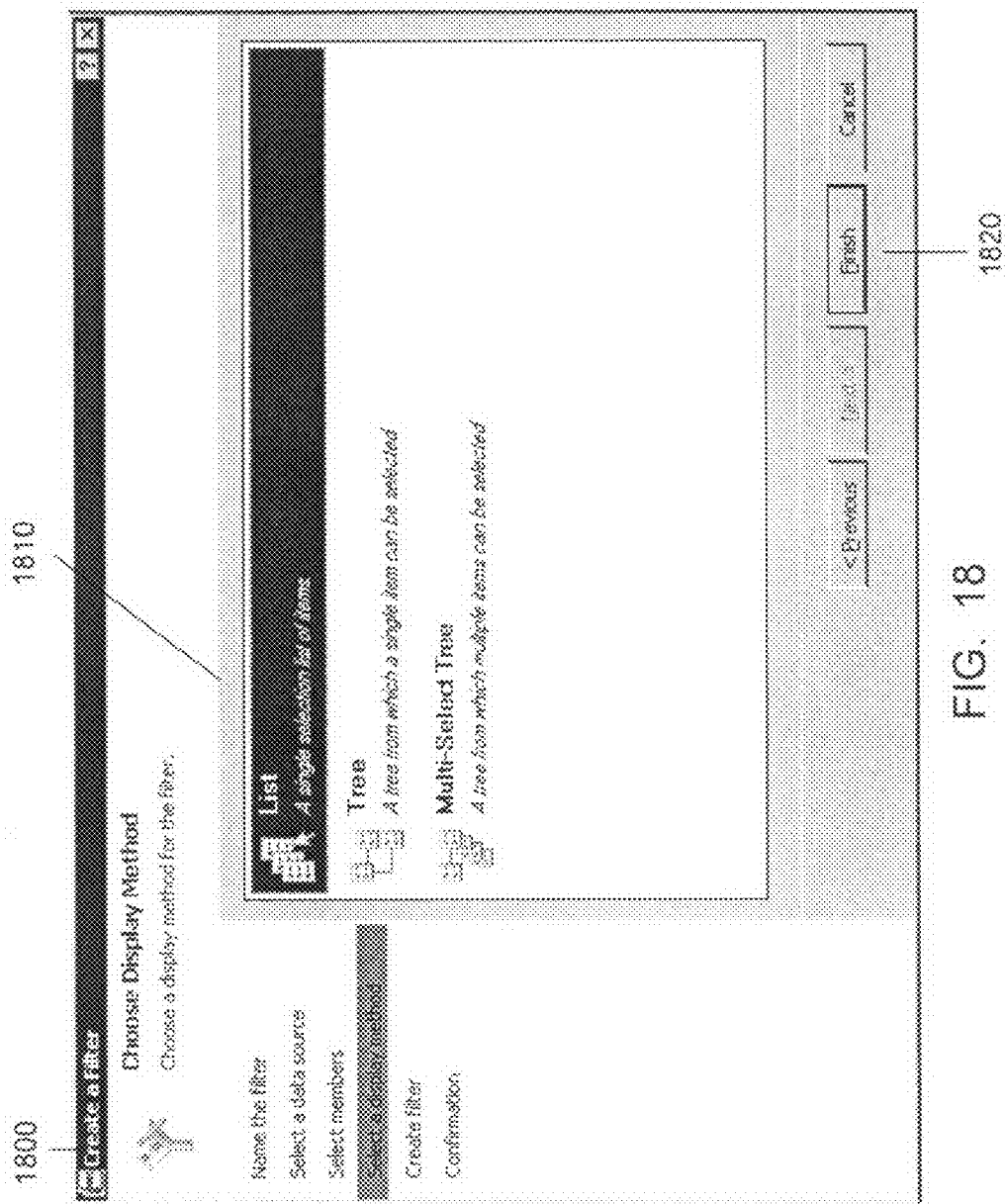
FIG. 18 shows an example display method interface of a filter creation wizard.

Referring now to FIG. 17, the members interface 1400 is shown with the dimensions and members that are selected.

Next, the user selects a display method for the filter in an example interface 1800. A display methods area 1810 shows that the available display methods are a list, a tree, and a multi-select tree. When a display method is selected, a finish button 1820 is clicked to continue.

Figure 19:
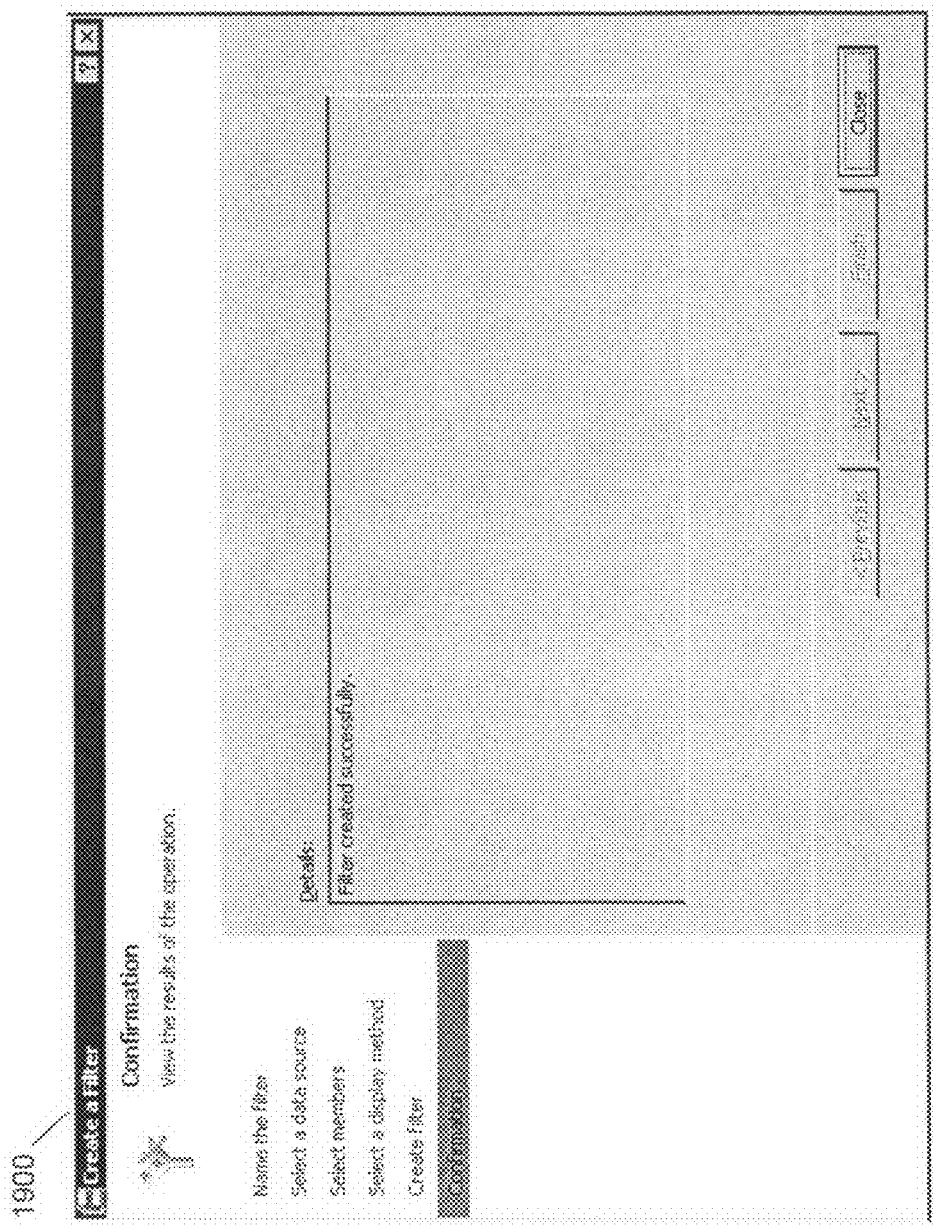
FIG. 19 shows an example confirmation interface of a filter creation wizard.

Finally, a confirmation interface 1900 is provided for the filter as shown in FIG. 19 that confirms that the filter has been created successfully using the wizard.

Figure 20:
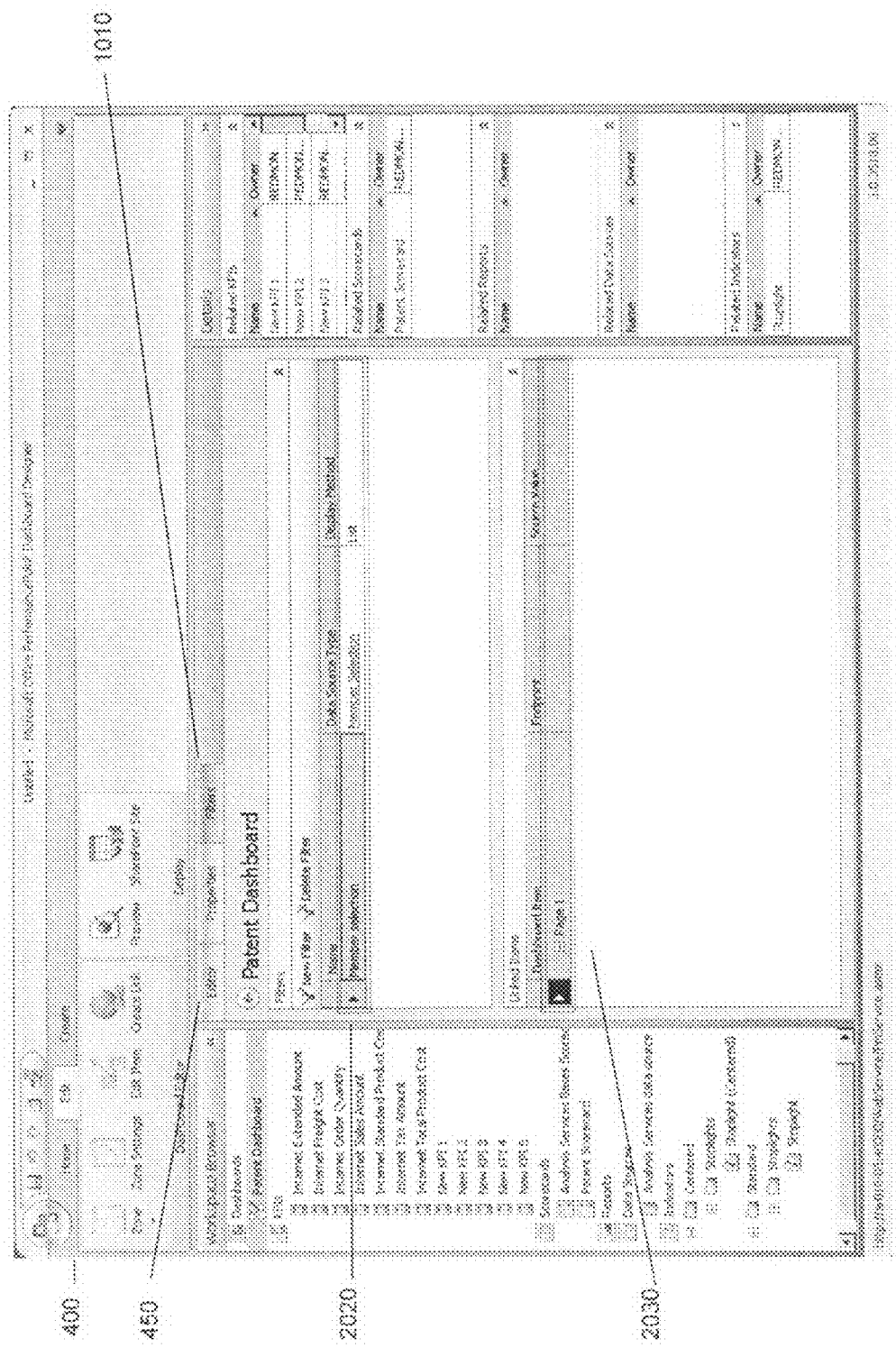
FIG. 20 shows an example dashboard editor including a filter in a zone of a dashboard workspace.

FIG. 20 shows the dashboard editor 400 with a member selection filter 2020 (created as described above using the wizard) shown listed as an available filter. The filter workspace 1005 also shows no filter connections in the linked item area 2030, since the member selection filter 2020 has not been linked yet. Once filters are created, the filters can be linked to the scorecards and reports to which the filters will be applied. To add the member selection filter 2020 to the dashboard, the user selects editor tab 450 to access the dashboard workspace 430.

Figure 21:
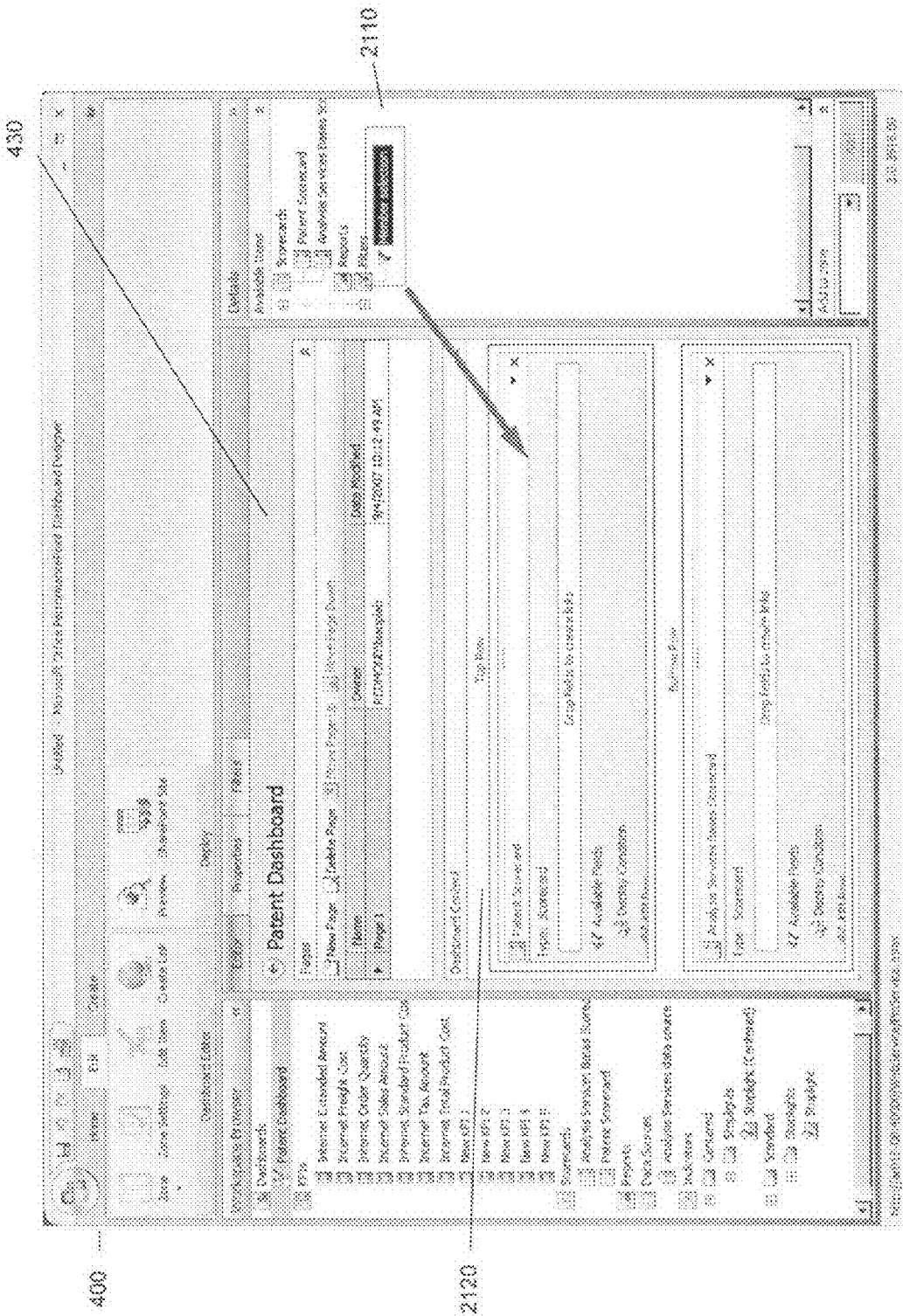
FIG. 21 shows another example dashboard editor including a filter that is dragged onto a scorecard in a zone of a dashboard workspace.

FIG. 21 shows the dashboard workspace 430 with a member selection filter 2110 listed as an available filter. To add this filter to the dashboard workspace 430, the member selection filter 2110 is dragged and dropped into the top row zone 2120.

Figure 22:
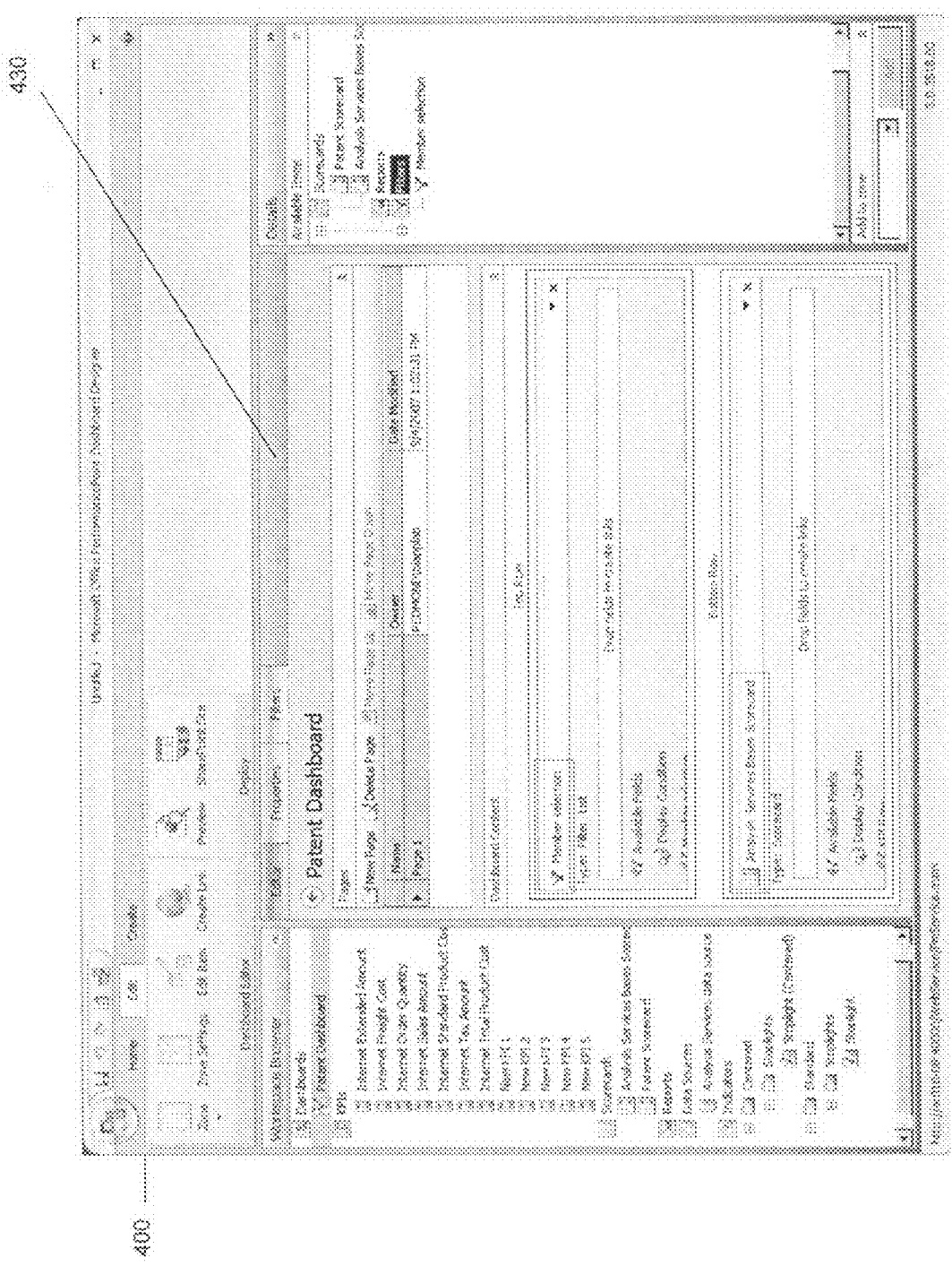
FIG. 22 shows another example dashboard editor with a filter added to a zone of a dashboard workspace.

FIG. 22 shows the result of the drag and drop operation. (Note that the scorecard originally included in the top row zone has been removed for purposes of clarity only. A zone can hold multiple objects, if desired.) In order for an item in the dashboard workspace 430, such as the scorecard in the bottom row of the workspace 430, to use the filter, the filter must be connected to the item.

Figure 23:
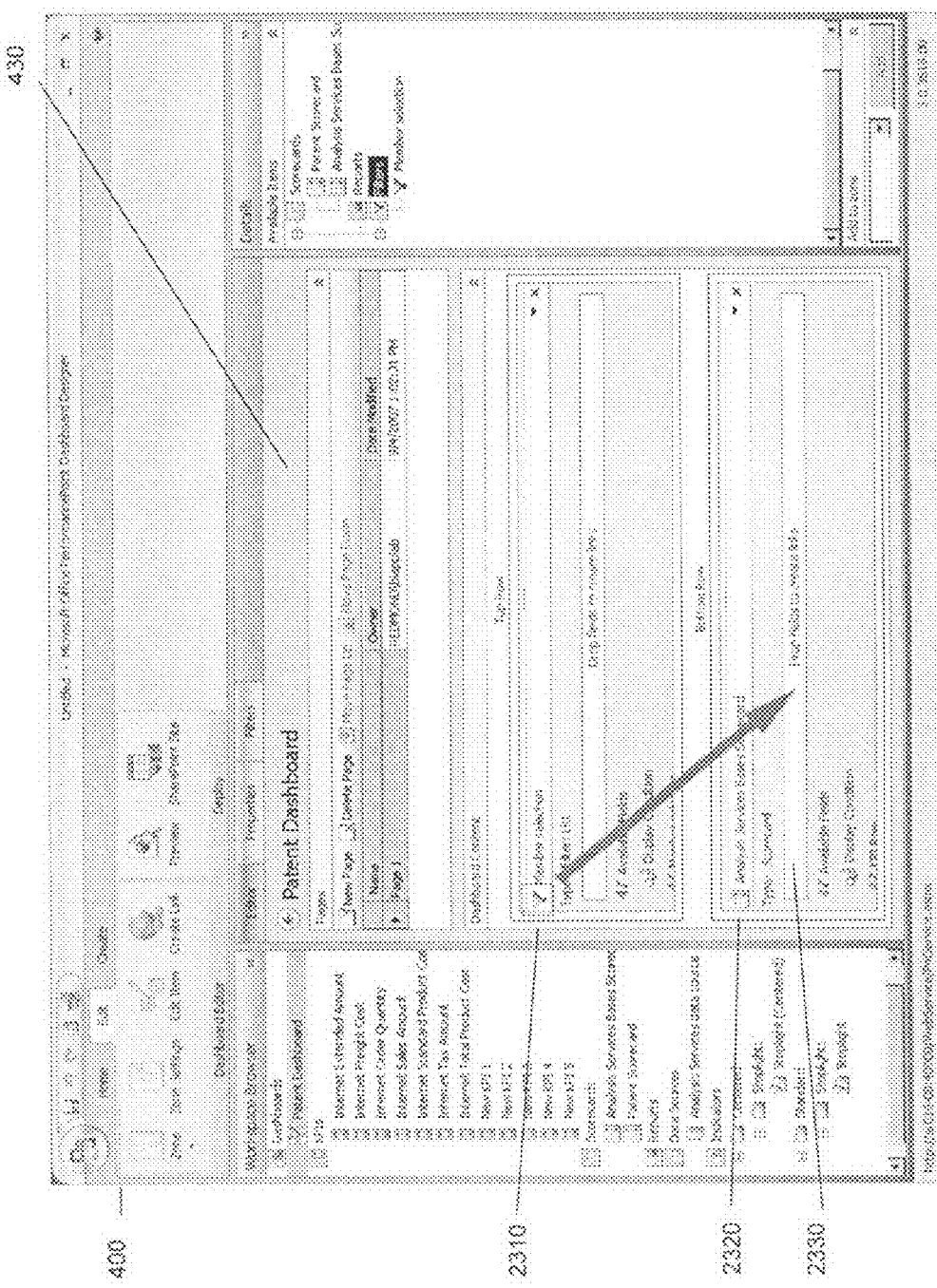
FIG. 23 shows the dashboard editor of FIG. 22 with the filter dragged onto a scorecard in another zone of the dashboard workspace.

FIG. 23 shows an example screen for connecting the member selection filter 2310 to the analysis services basis scorecard 2320. The filter 2310 can be dragged onto a drop area 2330 to connect the filter to the scorecard 2320.

Figure 24:
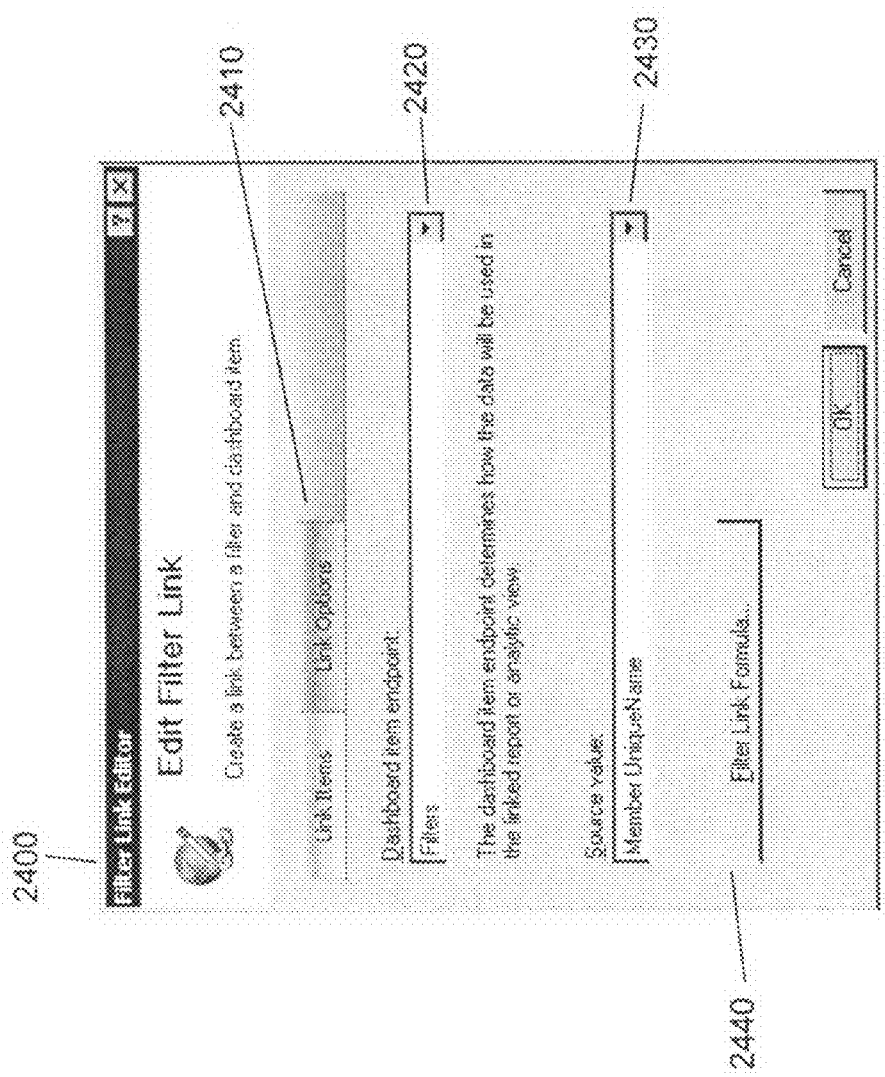
FIG. 24 shows an example edit filter link interface with a link options tab selected.
Figure 25:
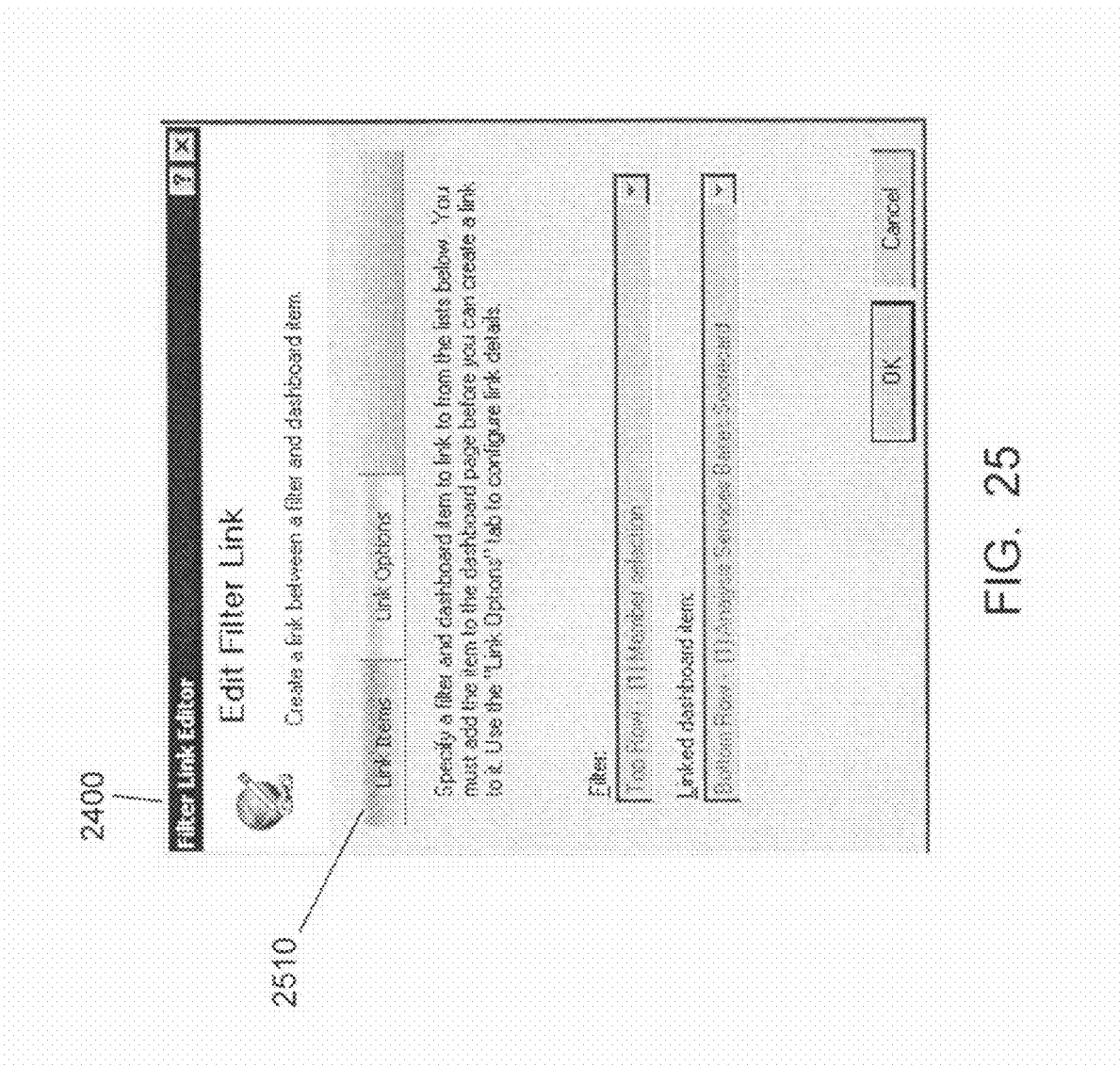
FIG. 25 shows the edit filter link interface of FIG. 24 with a link items tab selected.

When the filter is connected in the manner described, the user is presented with the edit filter link dialog box 2400 as shown in FIG. 24. The link options tab 2410 is highlighted. This allows the user to select a dashboard item endpoint which determines how the data will be used. A drop down menu 2420 for the dashboard item endpoint provides choices including filters, rows, columns, geography and time. In this example, filters is chosen for the endpoint. The user can also select a source value from dropdown menu 2430, and can enter a filter link formula by selecting a box 2440.

The user can also select a link items tab 2450 to show the default link between the filter and the object that will be filtered. When configured as described herein, these values are not editable. The user can also select to define the connection between the filter and the object by using the object drop down menu or the ribbon, as described further below.

Figure 26:
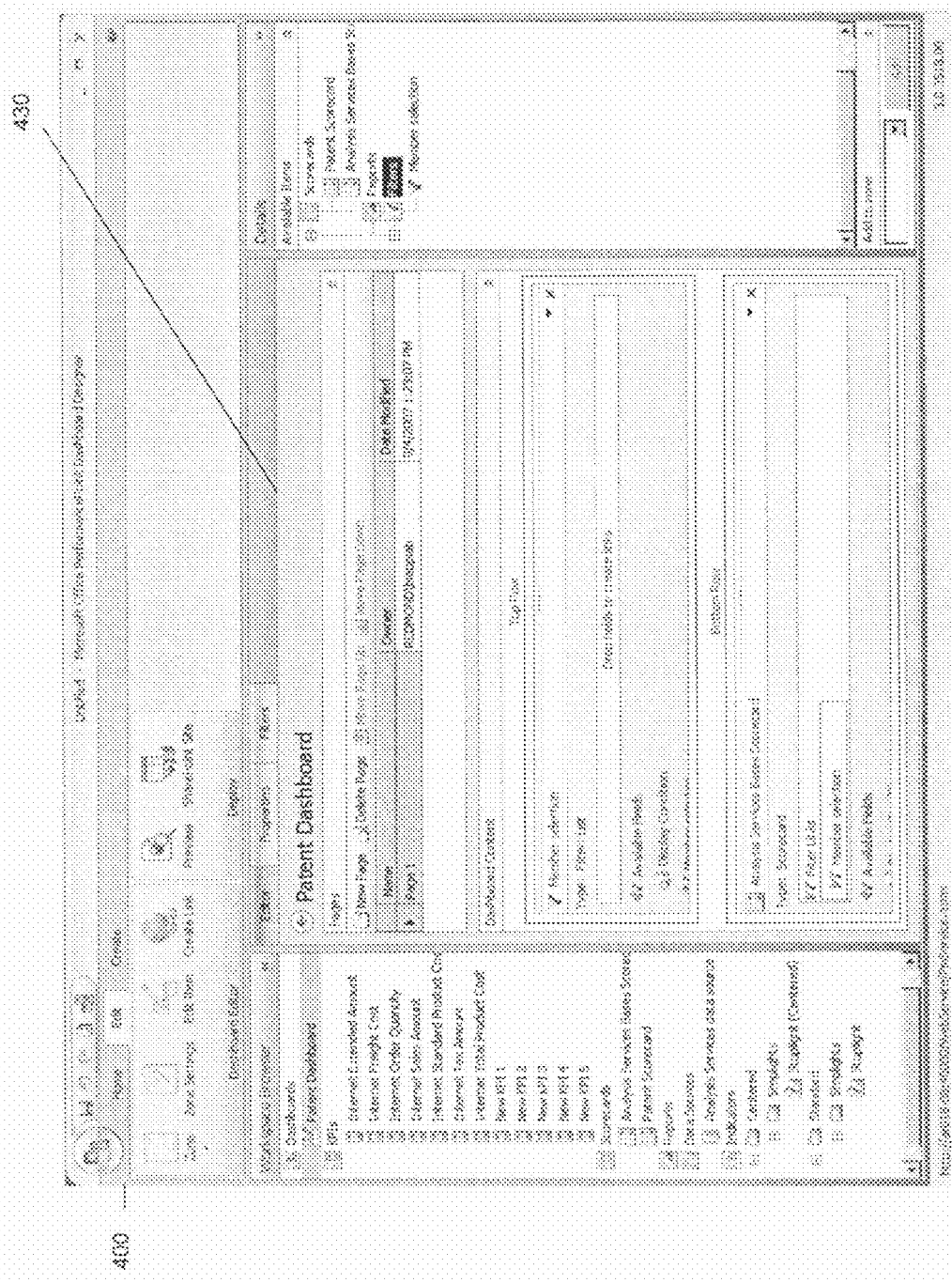
FIG. 26 shows the dashboard editor of FIG. 22 with the filter added to the scorecard.

Referring now to FIG. 26, the dashboard editor 400 is shown with the filter applied. As shown, the scorecard in the bottom row zone of the workspace 430 lists the filter (member selection) as part of the scorecard.

Figure 27:
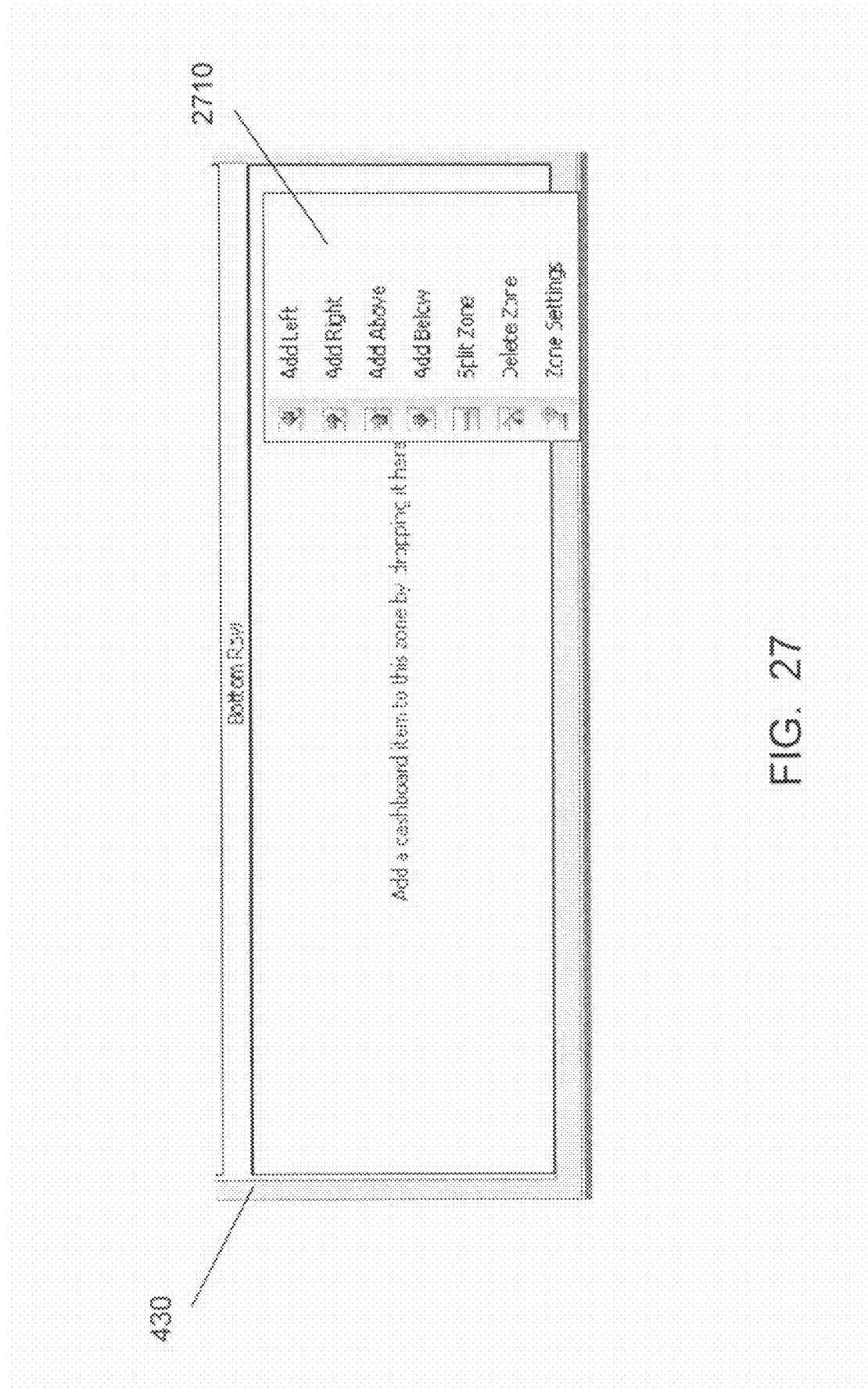
FIG. 27 shows a portion of an example dashboard editor with a menu for editing a zone of a workspace.

Referring now to FIG. 27, a zone in the workspace 430 can be edited by selecting the zone and using control elements on the ribbon 410, or by right-clicking to access a menu 2710. The menu 2710 allows the user to add, split or remove zones until the zones of the dashboard represent the dashboard layout the user wishes to create. The user can also select zone settings in the menu 2710 to change the settings of the zone.

In addition to accessing menus, the user can simply drag and drop zones within the workspace 430 to change the placement of the zones. For example, the user can drag the zone located in the bottom row above the top row to change the order of the zones.

Figure 28:
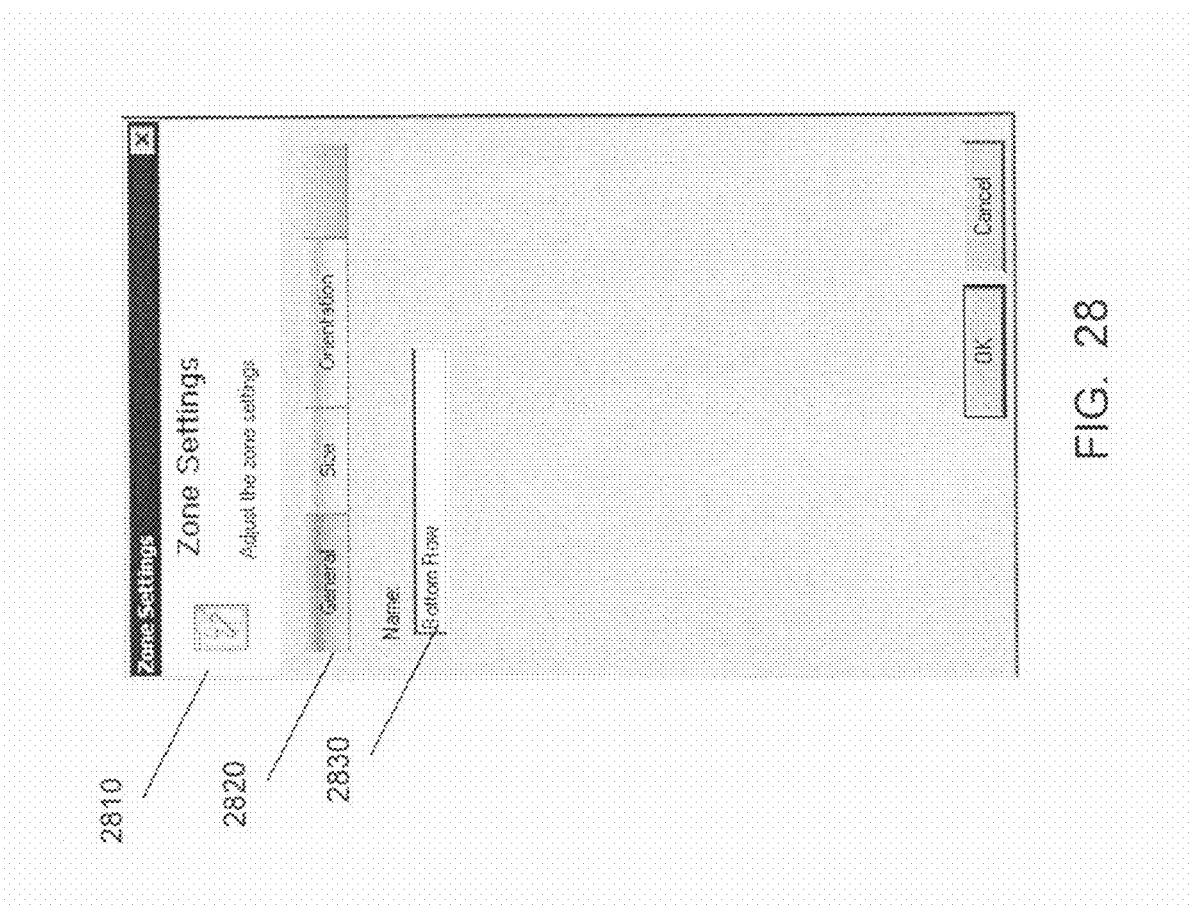
FIG. 28 shows an example zone settings interface with a general tab selected.
Figure 29:
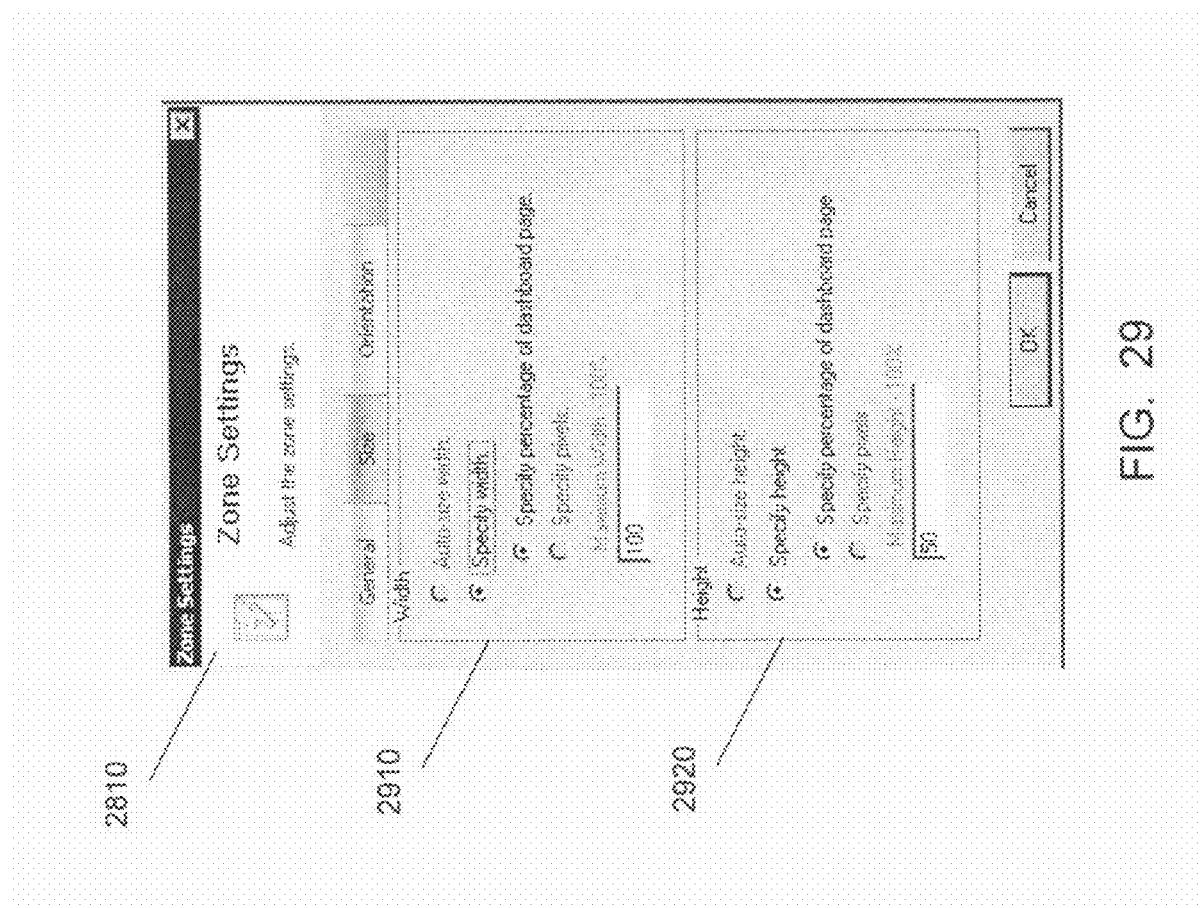
FIG. 29 shows an example zone settings interface with a size tab selected.
Figure 30:
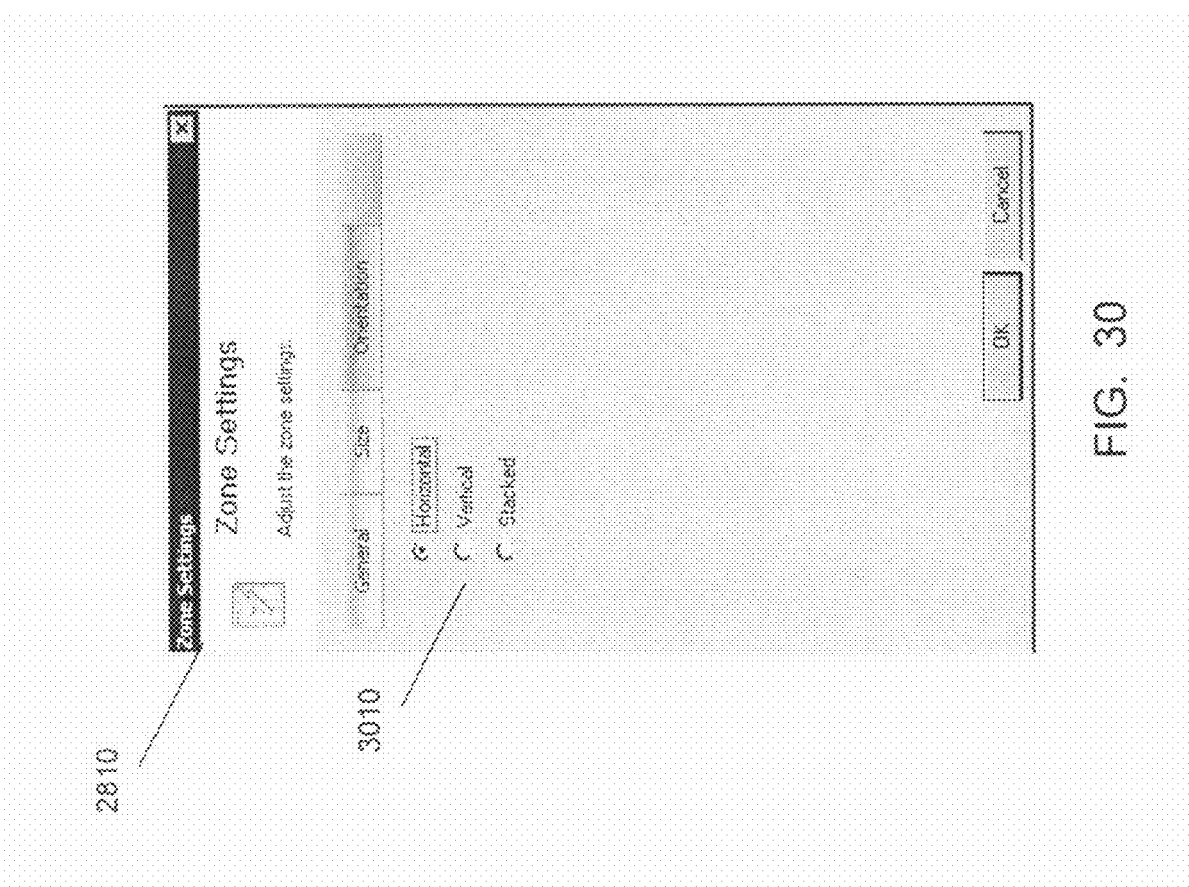
FIG. 30 shows an example zone settings interface with an orientation tab selected.

Referring now to FIGS. 28-30, a zone settings interface 2810 is shown. The zone settings interface includes tabs 2820 that are used to access general, size, and orientation settings. With the general tab selected in FIG. 28, the user can access a textbox 2830 to name the zone. With the size tab selected in FIG. 29, the user can access width setting area 2910 and height setting area 2920 to set the width and height by autosizing or specifying a particular percentage of the page or pixel size. With the orientation tab selected, the user can select orientation settings 3010 including horizontal, vertical, and stacked.

Figure 31:
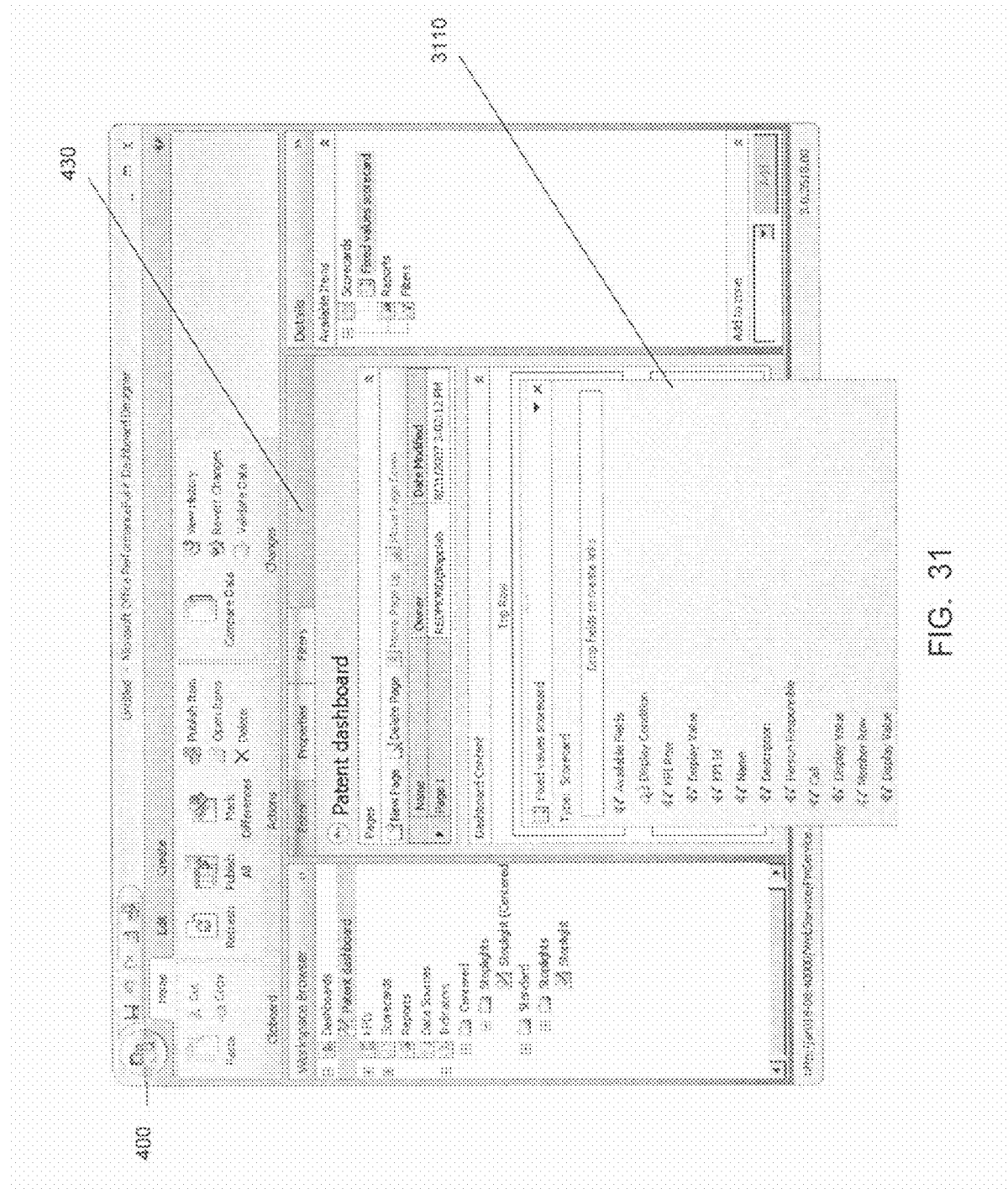
FIG. 31 shows another example dashboard editor with a zone in a workspace expanded.

Referring now to FIG. 31, any objects positioned in a zone, such as scorecards, will automatically expand when the cursor hovers over the object to expose all of the options associated with the object. For example, when the cursor hovers over the fixed values scorecard in the top row zone of the workspace 430, the zone automatically expands to provide a list 3110 showing all of the options associated with the scorecard. This allows the size of the logical view for a particular zone to remain fixed while still allowing the user to access the information in smaller screen sizes.

Figure 32:
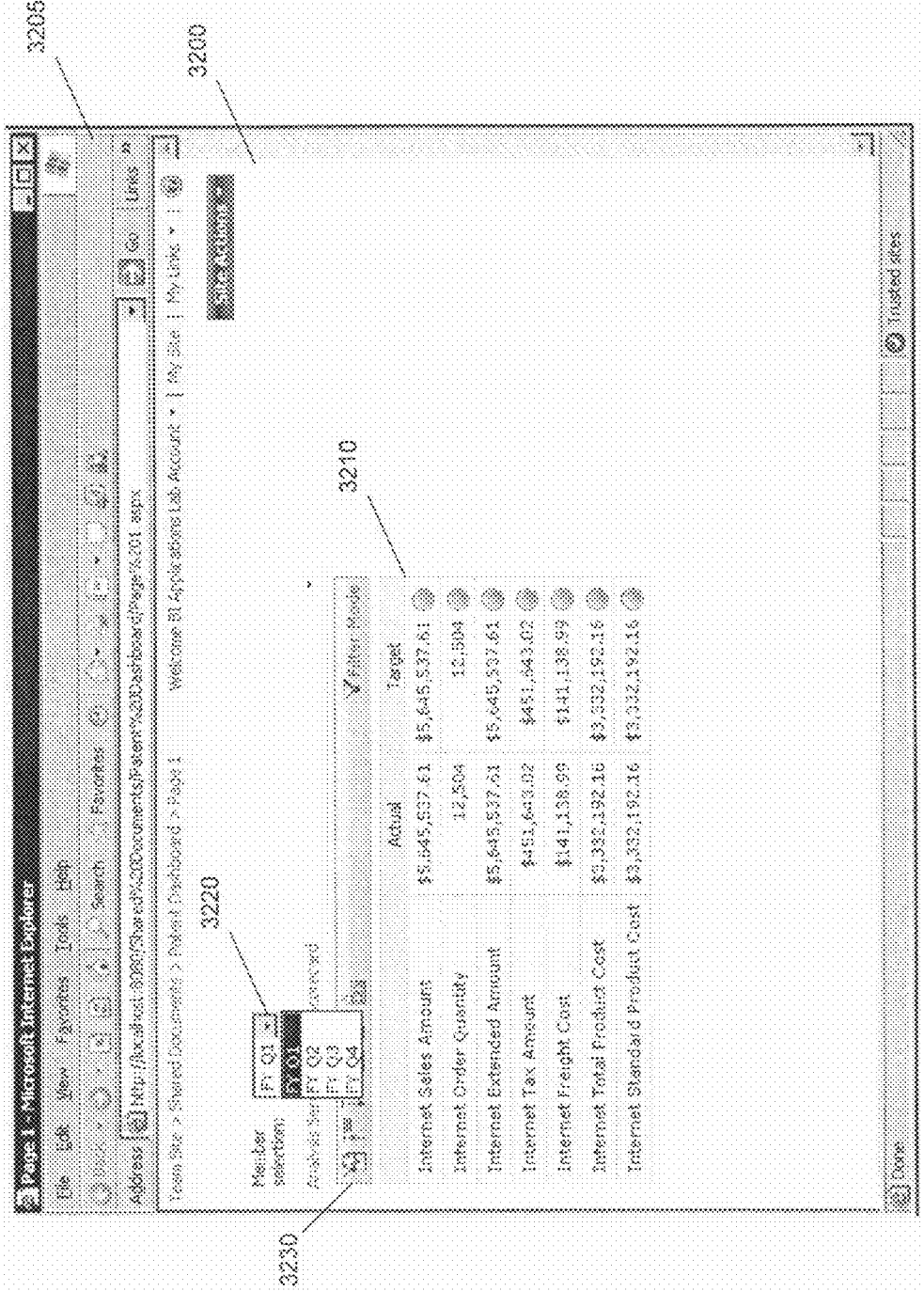
FIG. 32 shows an example dashboard that is published to a server.

Referring now to FIG. 32, an example dashboard 3200 is shown. The dashboard 3200 has been created using the dashboard editor 400. The dashboard 3200 can be published to a server (e.g., server 102 describe above) so that the dashboard 3200 is accessible by a plurality of clients (e.g., client 106) using, for example, a web browser 3205. The dashboard 3200 includes metrics 3210, as well as a selection dropdown 3220 that allows the user to sort the data shown on the dashboard 3200 by quarter. Also, the dashboard 3200 includes a toolbar 3230 that allows the user to modify the format of the metrics 3210. For example, the user can select control elements on the toolbar 3230 to change the sort directions of the data or modify the filtering of the data. Other configurations are possible.

Figure 33:
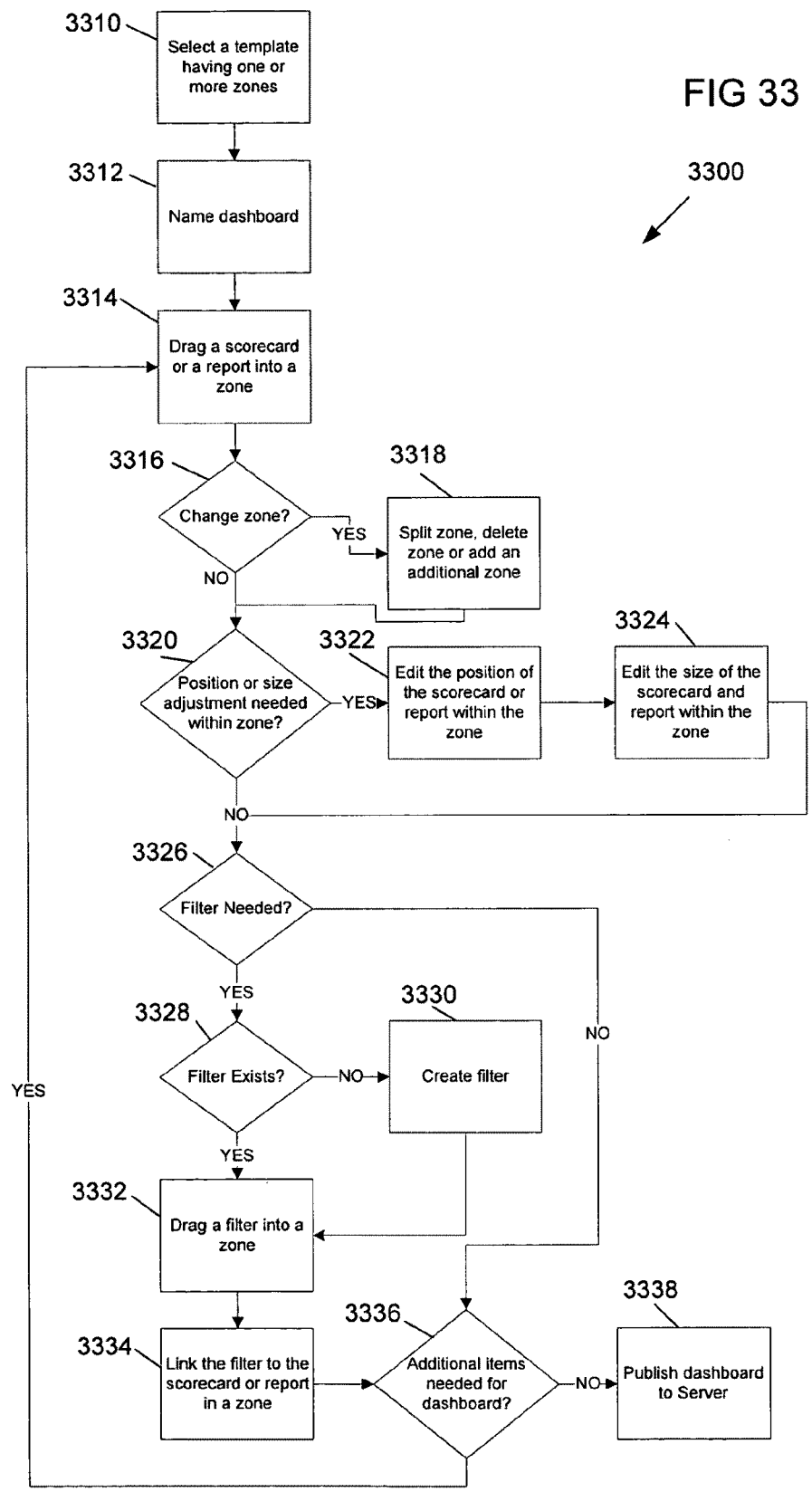
FIG. 33 shows an example method for creating a dashboard.

Referring now to FIG. 33, an example method 3300 for creating a dashboard is shown. Initially, at operation 3310, a template from the dashboard is selected having one or more zones. Next, at operation 3312, the dashboard is given a name. Control is then passed to operation 3314, at which a scorecard or report is dragged onto a zone of the dashboard.

At operation 3316, a determination is made as to whether or not a zone needs to be changed. If so, control is passed to operation 3318, and the zone can be changed (e.g., split, deleted, new zone added, etc.). If a zone does not need to be changed, control is instead passed from operation 3316 to operation 3320.

At operation 3320, a determination is made as to whether or not a zone needs to be adjusted. If so, control is passed to operations 3322 and 3324, at which the position and/or size of the zone can be adjusted. If a zone does not need to be adjusted, control is instead passed from operation 3320 to operation 3326.

At operation 3326, a determination is made as to whether or not a filter is needed. If not, control is passed to operation 3336, at which a determination is made as to whether or not addition items need to be added to the dashboard. If so, control is passed back to operation 3314. If not, control is passed to operation 3338, at which the dashboard can be published to a server.

Referring back to operation 3326, if the determination is made that a filter is needed, control is instead passed to operation 3328. At operation 3328, a determination is made as to whether or not the desired filter exists. If the filter does not exist, control is passed to operation 3330, at which the filter is created (see method 3400 described below). If the filter does exist, control is instead passed from operation 3328 to operation 3332.

At operation 3332, the filter is dragged onto a zone of the dashboard. Next, at operation 3334, the filter is linked to a scorecard or report in the dashboard. Next, control is then passed to operation 3336, as described above.

Figure 34:
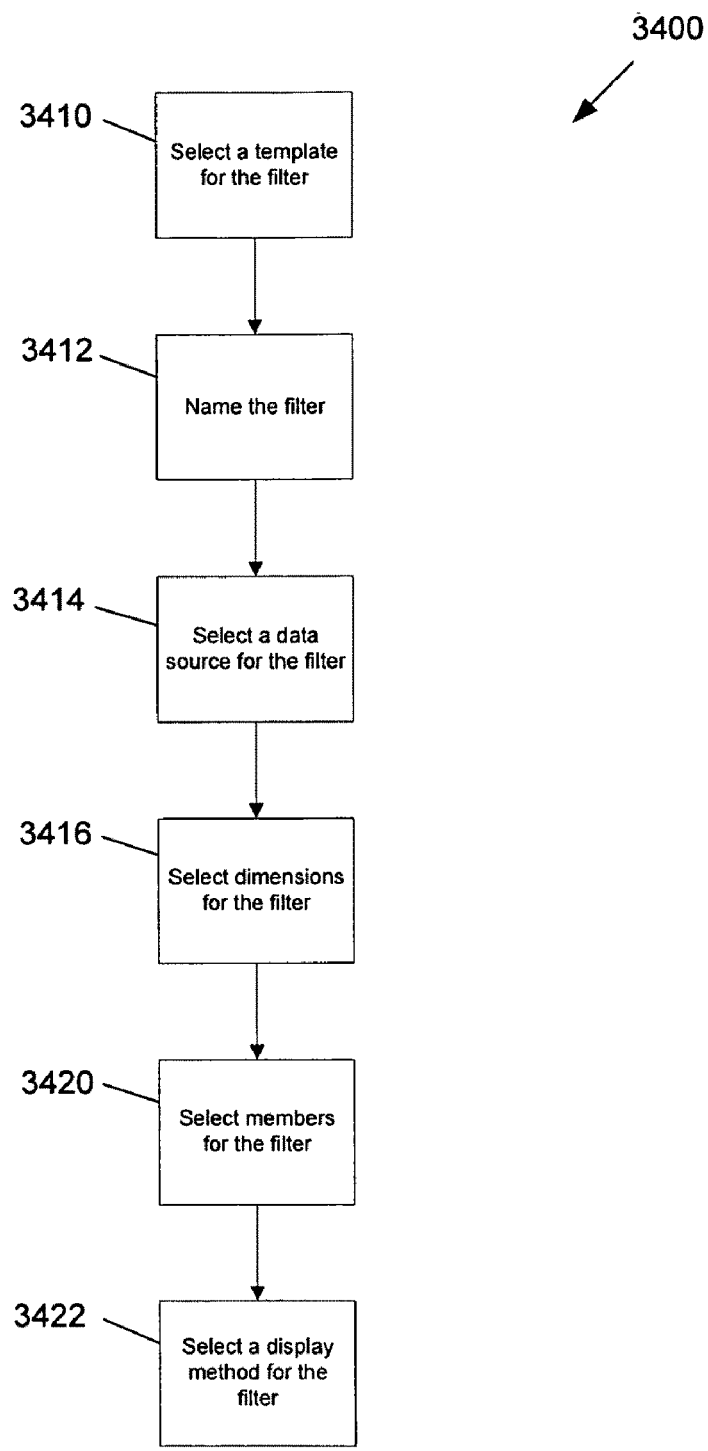
FIG. 34 shows an example method for creating a filter.

Referring now to FIG. 34, an example method 3400 for creating a filter for a dashboard is shown. Initially, at operation 3410, a template is selected for the filter. Next, at operation 3412, the filter is given a name. At operation 3414, the data source for the filter is selected.

Next, at operation 3416, the dimensions for the filter are selected. At operation 3420, the members for the filter are selected. Finally, at operation 3422, the display method for the filter is selected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device including a user interface programmed to create a digital dashboard, the computing device comprising:
   a central processing unit; and
   computer storage media encoding instructions that, when executed by the central processing unit, create:
      a dashboard workspace including one or more zones including at least a top row zone; and
      a dashboard elements area including a plurality of dashboard elements;
      wherein a dashboard element of the dashboard elements is dragged and dropped onto the top row zone to add the dashboard element to the digital dashboard;
      wherein, upon adding the dashboard element to the top row zone, a drop zone area for filters associated with the dashboard element is formed; and
      wherein the dashboard element includes an edit interface having:
         a display position box that defines a position of the dashboard element relative to other elements in the top row zone; and
         a cache box that defines whether or not the dashboard element is cached.

2. The computing device of claim 1, wherein the dashboard element is a scorecard.

3. The computing device of claim 1, wherein the dashboard element is a report.

4. The computing device of claim 1, wherein the dashboard element is a filter.

5. The computing device of claim 4, further comprising a wizard programmed to assist a user in creating the filter.

6. The computing device of claim 5, wherein the wizard includes interfaces that guide the user in creating the filter.

7. The computing device of claim 1, further comprising one or more templates that define pre-configured layouts for the zones of the digital dashboard.

8. A method for creating a digital dashboard, the method comprising:
   creating, using a computing device, one or more zones in a dashboard module;
   dragging and dropping, using the computing device, a scorecard or report onto a zone;
   dragging and dropping a filter onto the zone;
   linking the filter to the scorecard or report; and
   forming an area listing any scorecards or reports to which the filter is applied.

9. The method of claim 8, further comprising splitting the zone into a plurality of zones.

10. The method of claim 8, further comprising adding a new zone left, right, above, or below the zone.

11. The method of claim 8, further comprising publishing the digital dashboard to a web server.

12. The method of claim 8, further comprising changing a size of the zone.

13. The method of claim 8, further comprising dragging and dropping a plurality of scorecards and reports onto the one or more zones.

14. The method of claim 8, further comprising creating a new filter using a wizard.

15. The method of claim 14, further comprising linking the filter to a scorecard or report using a formula.

* * * * *